United States Patent
Nakayama et al.

(10) Patent No.: US 10,785,415 B2
(45) Date of Patent: Sep. 22, 2020

(54) DISPLAY CONTROL DEVICE AND DISPLAY CONTROL METHOD

(71) Applicant: SONY CORPORATION, Tokyo (JP)

(72) Inventors: Daisuke Nakayama, Tokyo (JP); Kouji Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/074,002

(22) PCT Filed: Feb. 20, 2017

(86) PCT No.: PCT/JP2017/006075
§ 371 (c)(1),
(2) Date: Jul. 30, 2018

(87) PCT Pub. No.: WO2017/150238
PCT Pub. Date: Sep. 8, 2017

(65) Prior Publication Data
US 2019/0045136 A1 Feb. 7, 2019

(30) Foreign Application Priority Data
Mar. 3, 2016 (JP) ................. 2016-041438

(51) Int. Cl.
*H04N 5/232* (2006.01)
*G06F 3/14* (2006.01)
(Continued)

(52) U.S. Cl.
CPC ......... *H04N 5/232935* (2018.08); *G06F 3/14* (2013.01); *H04N 5/232* (2013.01);
(Continued)

(58) Field of Classification Search
USPC ........................... 386/223–224, 230
See application file for complete search history.

(56) References Cited

U.S. PATENT DOCUMENTS

2005/0219378 A1* 10/2005 Kubota ............... H04N 7/0105
348/222.1
2006/0285831 A1 12/2006 Tanaka
(Continued)

FOREIGN PATENT DOCUMENTS

| CN | 1914665 A | 2/2007 |
|---|---|---|
| JP | 2002-354401 A | 12/2002 |

(Continued)

OTHER PUBLICATIONS

International Search Report and Written Opinion of PCT Application No. PCT/JP2017/006075, dated May 16, 2017, 10 pages of ISRWO.

*Primary Examiner* — Hung Q Dang
(74) *Attorney, Agent, or Firm* — Chip Law Group

(57) ABSTRACT

The present technology relates to a display control device, a display control method, and a program that make it possible to provide an interface useful for a user to easily determine an optimal frame rate. At least a first image and a second image that are at different frame rates or that have different image quality in frames at the same time are displayed on the same position in a display region of a display device. The present technology can be applied, for example, to a digital camera or the like that can image images at a plurality of frame rates.

16 Claims, 16 Drawing Sheets

(51) Int. Cl.
*H04N 5/783* (2006.01)
*H04N 5/77* (2006.01)
*G09G 5/14* (2006.01)

(52) U.S. Cl.
CPC ......... *H04N 5/23232* (2013.01); *H04N 5/772* (2013.01); *H04N 5/783* (2013.01); *G09G 5/14* (2013.01); *G09G 2340/0435* (2013.01); *G09G 2352/00* (2013.01)

(56) References Cited

U.S. PATENT DOCUMENTS

| | | |
|---|---|---|
| 2007/0159490 A1 | 7/2007 | De Greef |
| 2011/0141355 A1* | 6/2011 | Boak ........................ H04N 5/46 |
| | | 348/513 |
| 2011/0164860 A1 | 7/2011 | Nakagawa |
| 2014/0240516 A1* | 8/2014 | Kolarov ................ H04N 5/265 |
| | | 348/180 |
| 2014/0285635 A1* | 9/2014 | Ju ........................ H04N 13/106 |
| | | 348/47 |
| 2015/0350555 A1* | 12/2015 | Nishi ................ H04N 5/23293 |
| | | 348/333.02 |
| 2016/0337555 A1* | 11/2016 | Li ......................... H04N 5/247 |

FOREIGN PATENT DOCUMENTS

| | | |
|---|---|---|
| JP | 2006-352529 A | 12/2006 |
| JP | 2007-519968 A | 7/2007 |
| JP | 2011-160408 A | 8/2011 |
| JP | 2012-249100 A | 12/2012 |
| KR | 10-2006-0128982 A | 12/2006 |
| WO | 2005/073955 A1 | 8/2005 |

\* cited by examiner

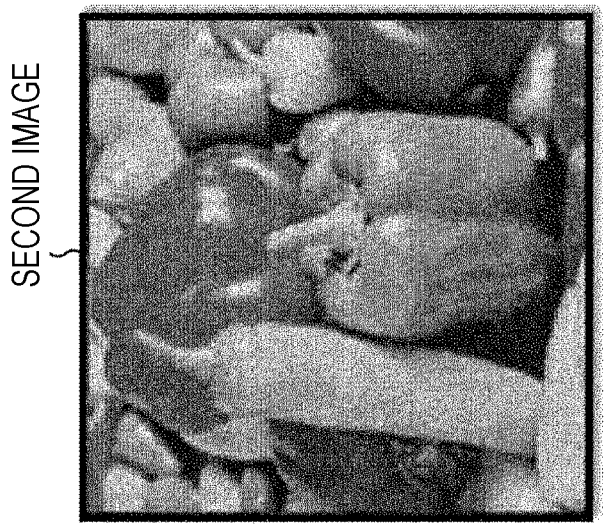
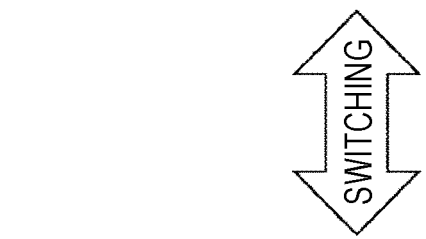
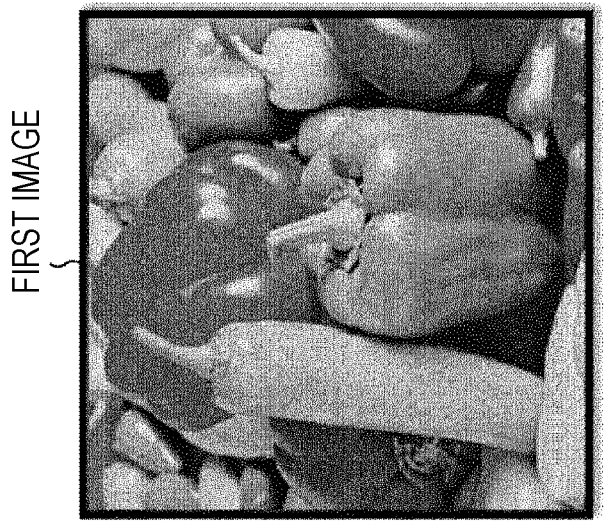
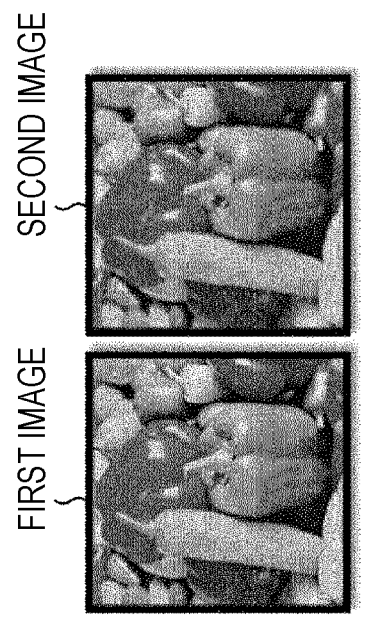
FIG. 9A
FIG. 9B

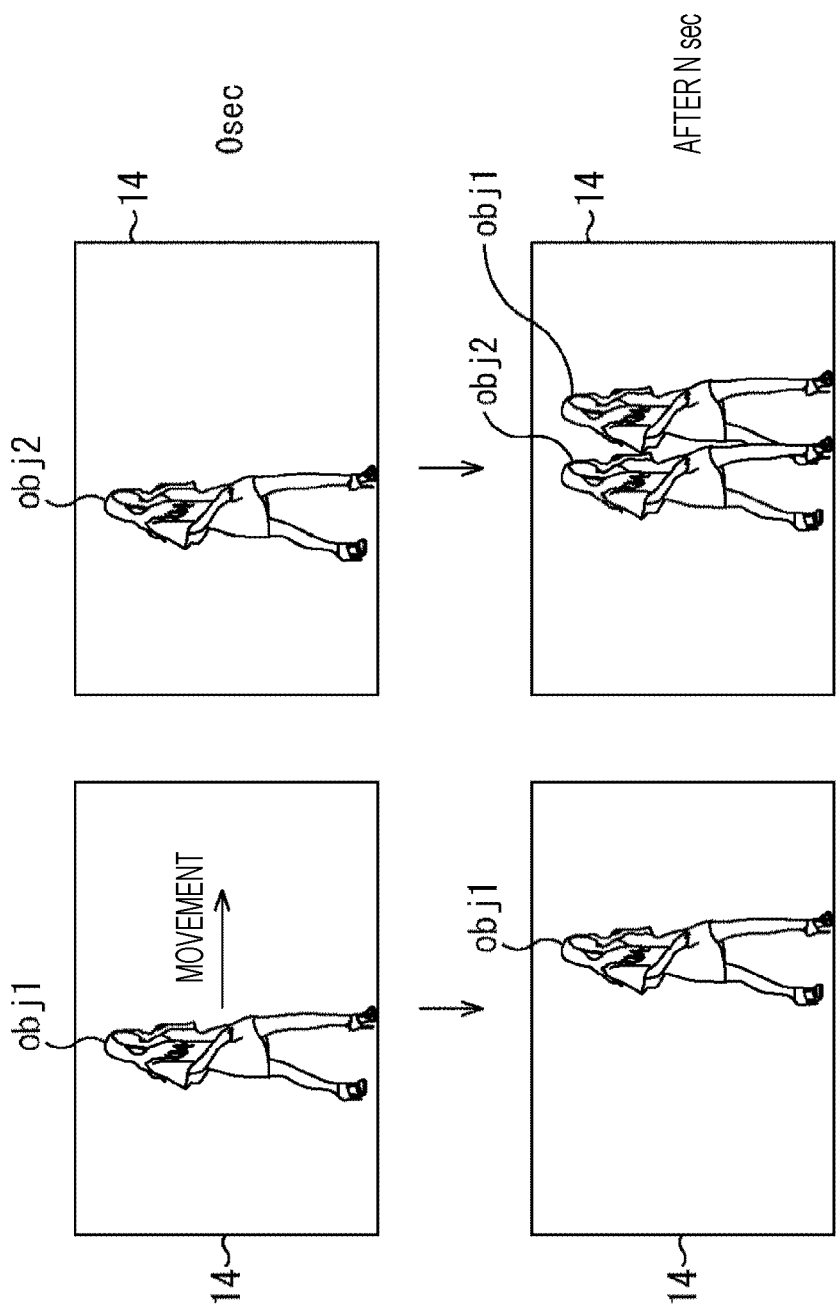

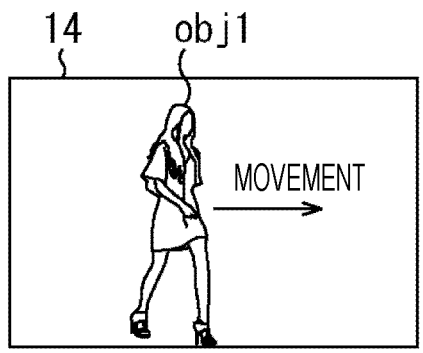
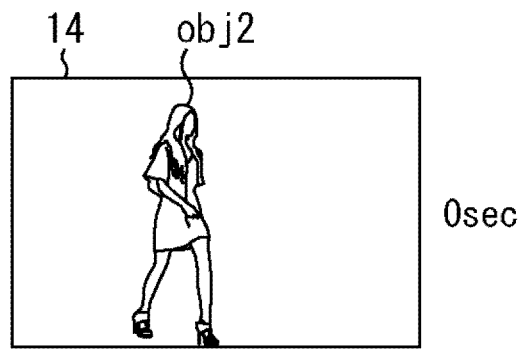
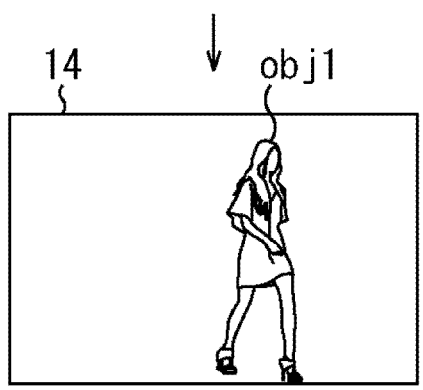
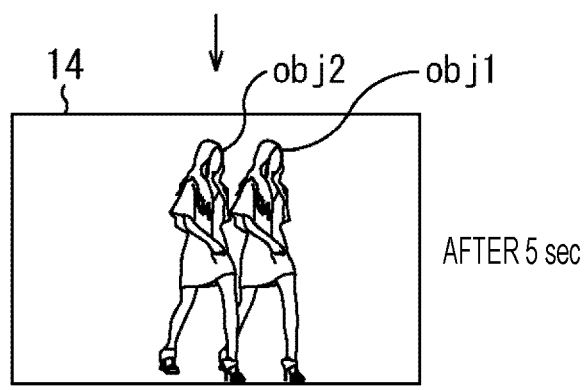
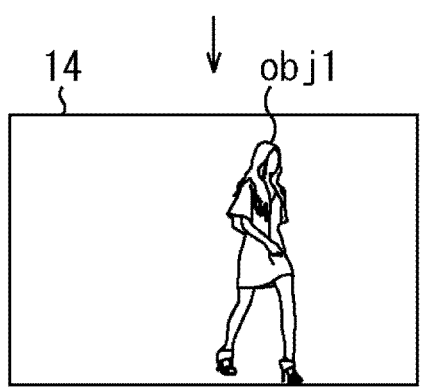
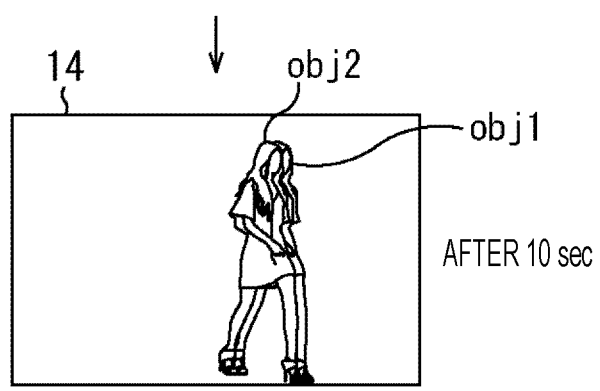
FIG. 13A        FIG. 13B

DISPLAY CONTROL DEVICE AND DISPLAY CONTROL METHOD

CROSS REFERENCE TO RELATED APPLICATIONS

This application is a U.S. National Phase of International Patent Application No. PCT/JP2017/006075 filed on Feb. 20, 2017, which claims priority benefit of Japanese Patent Application No. JP 2016-041438 filed in the Japan Patent Office on Mar. 3, 2016. Each of the above-referenced applications is hereby incorporated herein by reference in its entirety.

TECHNICAL FIELD

The present technology relates to a display control device, a display control method, and a program, and specifically relates to a display control device, a display control method, and a program that make it possible to provide an interface useful for a user to easily determine an optimal frame rate, for example.

BACKGROUND ART

For example, a digital camera that displays a (moving) image at different frame rates on multi windows is proposed (see, for example, Patent Document 1).

CITATION LIST

Patent Document

Patent Document 1: Japanese Patent Application Laid-Open No. 2007-336522

SUMMARY OF THE INVENTION

Problems to be Solved by the Invention

It is expected that it becomes possible for an image sensor to perform a multi-stream output, that is, to output streams of images at a plurality of frame rates by development of a device, improvement of processing performance, or the like. Moreover, it is expected that it becomes possible for a digital camera including such an image sensor to simultaneously process images at a plurality of frame rates which images are output by the image sensor, or to dynamically switch the frame rates of the images and to record the images.

In a case where an image at a high frame rate (hereinafter, also referred to as high frame rate image) is imaged in the digital camera, the high frame rate image can be used as an image with a smooth movement or can be used as a slow motion image.

Incidentally, in a case where a high frame rate image is imaged, for example, exposure time becomes short and a trade-off in which image quality of an image is deteriorated may be generated while an image with a smooth movement, or the like can be acquired. Moreover, for example, by an increase of an amount of data to be an object of various kinds of processing, a trade-off such as a decrease of the number of pixels of an image or omission of a part of processing may be generated.

A so-called through image (live view image) is displayed on a digital camera. However, with a through image, it is difficult for a user to check, with respect to a high frame rate image, image quality or an impression in utilization as a slow motion image.

That is, it is expected that image quality or an impression in utilization as a slow motion image of a high frame rate image is noticed for a first time, for example, after a high frame rate image is imaged (recorded) and the high frame rate image is reproduced and viewed.

If a user does not like image quality or an impression in utilization as a slow motion image after viewing a high frame rate image, the user needs to change a frame rate and to image a high frame rate image again.

Thus, there is a case where the user has to change a frame rate and record a high frame rate image again repeatedly in order to determine an optimal frame rate, and it is troublesome.

From the above, it is requested to propose a method with which a user can intuitively recognize image quality or an impression in utilization as a slow motion image of a high frame rate image and can easily determine an optimal frame rate before imaging (recording).

The present technology is provided in view of such a condition and is to make it possible to provide an interface useful for a user to easily determine an optimal frame rate.

Solutions to Problems

A display control device or a program of the present technology is a display control device including a display control unit that performs display control of displaying, on the same position in a display region of a display device, at least a first image and a second image that are at different frame rates or that have different image quality in frames at the same time, or a program causing a computer to function as such a display control device.

A display control method of the present technology is a display control method including a step of performing display control of displaying, on the same position in a display region of a display device, at least a first image and a second image that are at different frame rates or that have different image quality in frames at the same time.

In the display control device, the display control method, and the program of the present technology, at least a first image and a second image that are at different frame rates or that have different image quality in frames at the same time are displayed on the same position in a display region of a display device.

Note that the display control device may be an independent device or an internal block included in one device.

Also, the program can be provided by being transmitted through a transmission medium or being recorded in a recording medium.

Effects of the Invention

According to the present technology, an interface useful for a user to easily determine an optimal frame rate can be provided.

Note that an effect described herein is not necessarily limited and may be any of the effects described in the present disclosure.

BRIEF DESCRIPTION OF DRAWINGS

FIGS. 9A and 9B are views for describing a case where flip switching of the first and second images is performed and a case where the first and second images are displayed side by side.

FIGS. 12A and 12B are views for describing a display example of displaying of the first and second images in the reference rate display control processing.

FIGS. 13A and 13B are views for describing an example of a following display.

MODE FOR CARRYING OUT THE INVENTION

<Embodiment of Digital Camera to which Present Technology is Applied>

Figure 1:
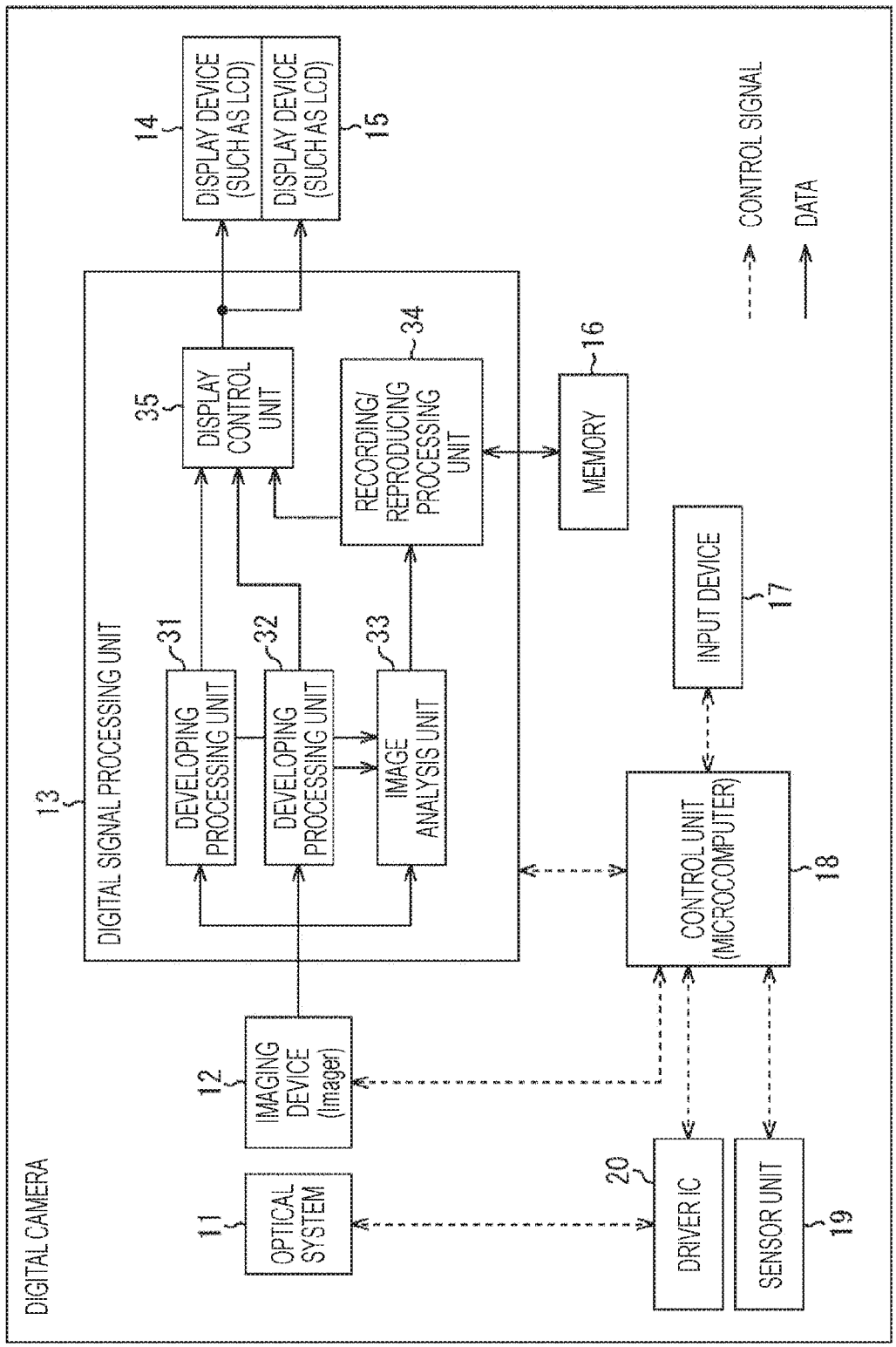
FIG. 1 is a block diagram illustrating a configuration example of an embodiment of a digital camera to which the present technology is applied.

FIG. 1 is a block diagram illustrating a configuration example of an embodiment of a digital camera to which the present technology is applied.

Note that a digital camera can image both of a still image and a moving image.

In FIG. 1, the digital camera includes an optical system 11, an imaging device 12, a digital signal processing unit 13, display devices 14 and 15, a memory 16, an input device 17, a control unit 18, a sensor unit 19, and a driver integrated circuit (IC) 20.

The optical system 11 includes, for example, a zoom lens, focus lens, diaphragm, or the like (not illustrated), and makes outside light enter the imaging device 12.

The imaging device 12 includes, for example, a complementary metal oxide semiconductor (CMOS) image sensor and performs imaging. That is, the imaging device 12 receives incident light from the optical system 11, performs photoelectric conversion, and acquires an image (signal) as an electric signal corresponding to the incident light from the optical system 11. Then, the imaging device 12 outputs an image acquired by the imaging.

Here, the imaging device 12 includes, for example, an image sensor that can output multi streams, that is, that can simultaneously output streams of images at a plurality of frame rates, and outputs a stream of one or a plurality of images acquired by imaging.

For example, the imaging device 12 can perform imaging at a plurality of frame rates such as a previously-determined default frame rate, and a frame rate higher or lower than the default frame rate, and can output (stream of) a plurality of images at different frame rates.

Also, in the imaging device 12, with an extremely-high frame rate as a default frame rate, imaging is performed at the default frame rate, and decimation of a frame of an image at the default frame rate which image is acquired by the imaging is performed if necessary, whereby it is possible to output images at a plurality of frame rates equal to or lower than the default frame rate. For example, as a method of performing decimation of a frame, a method of simply performing decimation of a frame, a method of performing decimation of a frame by adding a plurality of frames to each other, or the like can be employed.

Moreover, in addition to a case of including one image sensor, the imaging device 12 can include a plurality of image sensors and can perform imaging at different frame rates respectively in the plurality of image sensors and output images at a plurality of frame rates which images are acquired by the imaging.

Also, in the imaging device 12, a frame rate of one or more images among images at a plurality of frame rates which images can be output can be changed seamlessly, for example, in a unit of one frame per second [fps] or the like according to an instruction or the like from the outside.

As described above, as long as the imaging device 12 can output images at a plurality of frame rates and has a function of changing a frame rate of one or more images among the images at the plurality of frame rates, a configuration thereof is not specifically limited.

Note that in the following, in order to simplify the description, it is assumed that the imaging device 12 can perform imaging at a default frame rate and a frame rate different from the default frame rate and can output a first image at the default frame rate and a second image at the frame rate different from the default frame rate which images are acquired by the imaging.

Moreover, it is assumed that the imaging device 12 can change at least a frame rate of the second image.

The first and second images output from the imaging device 12 are supplied to the digital signal processing unit 13. Note that in addition to the first and second images output from the imaging device 12, for example, a plurality of images at different frame rates which images are downloaded from a server, or a plurality of images at different frame rates which images are reproduced from a recording medium can be supplied to the digital signal processing unit 13.

The digital signal processing unit 13 performs necessary signal processing with respect to (stream of) the first and second images from the imaging device 12 and supplies these to the display device 14 or 15, and the memory 16.

The digital signal processing unit 13 includes developing processing units 31 and 32, an image analysis unit 33, a recording/reproducing processing unit 34, and a display control unit 35.

The first image from the imaging device 12 is supplied to the developing processing unit 31. The developing processing unit 31 performs developing processing with respect to the first image from the imaging device 12, and outputs the first image after the developing processing. The first image after the developing processing which image is output from the developing processing unit 31 is supplied to the display control unit 35.

Here, for example, the developing processing can include processing of image quality improvement such as a noise removal in addition to processing of generating an image including data of color components of red (R), green (G), and blue (B) from an image of so-called RAW data.

The second image from the imaging device 12 is supplied to the developing processing unit 32. The developing processing unit 32 performs developing processing with respect to the second image from the imaging device 12, and outputs the second image after the developing processing. The second image after the developing processing which image is output from the developing processing unit 32 is supplied to the display control unit 35.

In addition to the first and second images output from the imaging device 12, the first image after the developing processing which image is output from the developing processing unit 31, and the second image after the developing processing which image is output from the developing processing unit 32 are supplied to the image analysis unit 33.

The image analysis unit 33 analyzes the first and second images from the imaging device 12, or the first image after the developing processing which image is from the developing processing unit 31 and the second image after the developing processing which image is from the developing processing unit 32. Moreover, the image analysis unit 33 detects an event point of the first and second images on the basis of an analysis result acquired by the analysis of the first and second images. The image analysis unit 33 supplies the event point along with the first and second images (one or both of set of first and second image from imaging device 12 and set of first and second image after developing processing) to the recording/reproducing processing unit 34.

Here, the event point indicates a frame in which a predetermined event is generated, such as a frame with a scene change, a (start or end) frame of a highlighted scene, a frame in which a predetermined object starts moving, or a frame in which a facial expression of an animal such as a human on the first and second images changes. The predetermined event can be previously set, for example.

The recording/reproducing processing unit 34 records/reproduces the first and second images that are from the image analysis unit 33 into/from a recording (storage) medium. That is, the recording/reproducing processing unit 34 encodes the first and second images from the image analysis unit 33 if necessary, and records (store) these into the memory 16. Also, by reading the first and second images from the memory 16 and performing decoding if necessary, the recording/reproducing processing unit 34 reproduces the first and second images and supplies these to the display control unit 35 or an external output terminal (not illustrated).

Note that in recording of the first and second images into memory 16, the recording/reproducing processing unit 34 can also record the event point detected with respect to the first and second images into the memory 16. The event point recorded in the memory 16 can be used for cueing from a frame indicated by the event point, or the like in reproduction of the first and second images recorded in the memory 16, for example.

The display control unit 35 performs display control of displaying each of the first and second images supplied by the developing processing units 31 and 32 onto the display device 14 or 15. Moreover, the display control unit 35 performs display control of displaying an image, which is other than the first and second images, such as an icon onto the display device 14 or 15.

Each of the display devices 14 and 15 includes, for example, a liquid crystal display (LCD) or organic electro luminescence (EL) and displays the first image, the second image, and a different image according to the control by the display control unit 35.

Note that the display device 14 is included, for example, in a display panel provided on a rear surface of the digital camera, and the display device 15 is included, for example, in an electric viewfinder (EVF) of the digital camera.

The memory 16 stores data such as the first and second images according to control by a recording/reproducing control unit 34.

The input device 17 is an operation unit that can be operated by a user. The input device 17 includes a physical operation unit, which can be operated mechanically, such as a shutter (record) button or a dial, or a virtual operation unit, which is displayed on the display device 14, such as an icon as a button or the like. The input device 17 supplies an operation signal corresponding to operation by the user to the control unit 18.

The control unit 18 includes, for example, a microcomputer, and controls each block included in the digital camera. That is, the control unit 18 controls the imaging device 12, the digital signal processing unit 13, the input device 17, the sensor unit 19, the driver IC 20, and the like according to information acquired from the imaging device 12, an operation signal from the input device 17, information acquired from the digital signal processing unit 13, sensor information output from the sensor unit 19, information acquired from the driver IC 20, and the like.

For example, according to the control by the control unit 18, the imaging device 12 performs imaging of the first image, imaging of the second image, changing of a frame rate of the second image, or the like.

The sensor unit 19 can include, for example, a sensor that detects sound of a microphone or the like, a sensor that detects acceleration, a sensor that detects (clock) time, or a sensor that detects a different arbitrary physical amount. The sensor unit 19 detects a predetermined physical amount, and outputs sensor information indicating the physical amount. The sensor information output from the sensor unit 19 is supplied to the control unit 18.

Here, the control unit 18 can detect an event point with respect to the first and second images on the basis of the sensor information from the sensor unit 19.

For example, on the basis of a detection result of sound as the sensor information from the sensor unit 19, the control unit 18 can detect a (start or end) frame in which loud sound is generated, or the like as an event point with respect to the first and second images. Also, for example, on the basis of a detection result of acceleration as the sensor information from the sensor unit 19, the control unit 18 can detect a (start or end) frame in which the digital camera is panned, or the like as an event point with respect to the first and second images.

The driver IC 20 controls (drives) a diaphragm, focus, or zoom of the optical system 11 according to the control by the control unit 18.

In the digital camera configured in the above manner, the imaging device 12 receives the incident light from the optical system 11, and outputs the first image or the second image according to the incident light.

The first image or the second image output from the imaging device 12 is supplied to the digital signal processing unit 13.

In the digital signal processing unit 13, the developing processing unit 31 performs developing processing with respect to the first image from the imaging device 12, and supplies this to the display control unit 35. Also, the developing processing unit 32 performs developing processing with respect to the second image from the imaging device 12, and supplies this to the display control unit 35.

The display control unit 35 displays the first image from the developing processing unit 31 or the second image from the developing processing unit 32 onto the display devices 14 and 15, whereby the first image or the second image is displayed as a through image on the display devices 14 and 15.

Also, in the digital camera, in a case where the user operates the record button included in the input device 17, for example, the recording/reproducing processing unit 34 records the first image or the second image output from the imaging device 12 (record first image or second image into memory 16) in the digital signal processing unit 13 until the record button is operated again.

Note that in the following, in order to simplify the description, the description will be made with a focus on a case where the first and second images are displayed on the display device 14 between the display devices 14 and 15.

<Example of First and Second Images>

Figure 2:
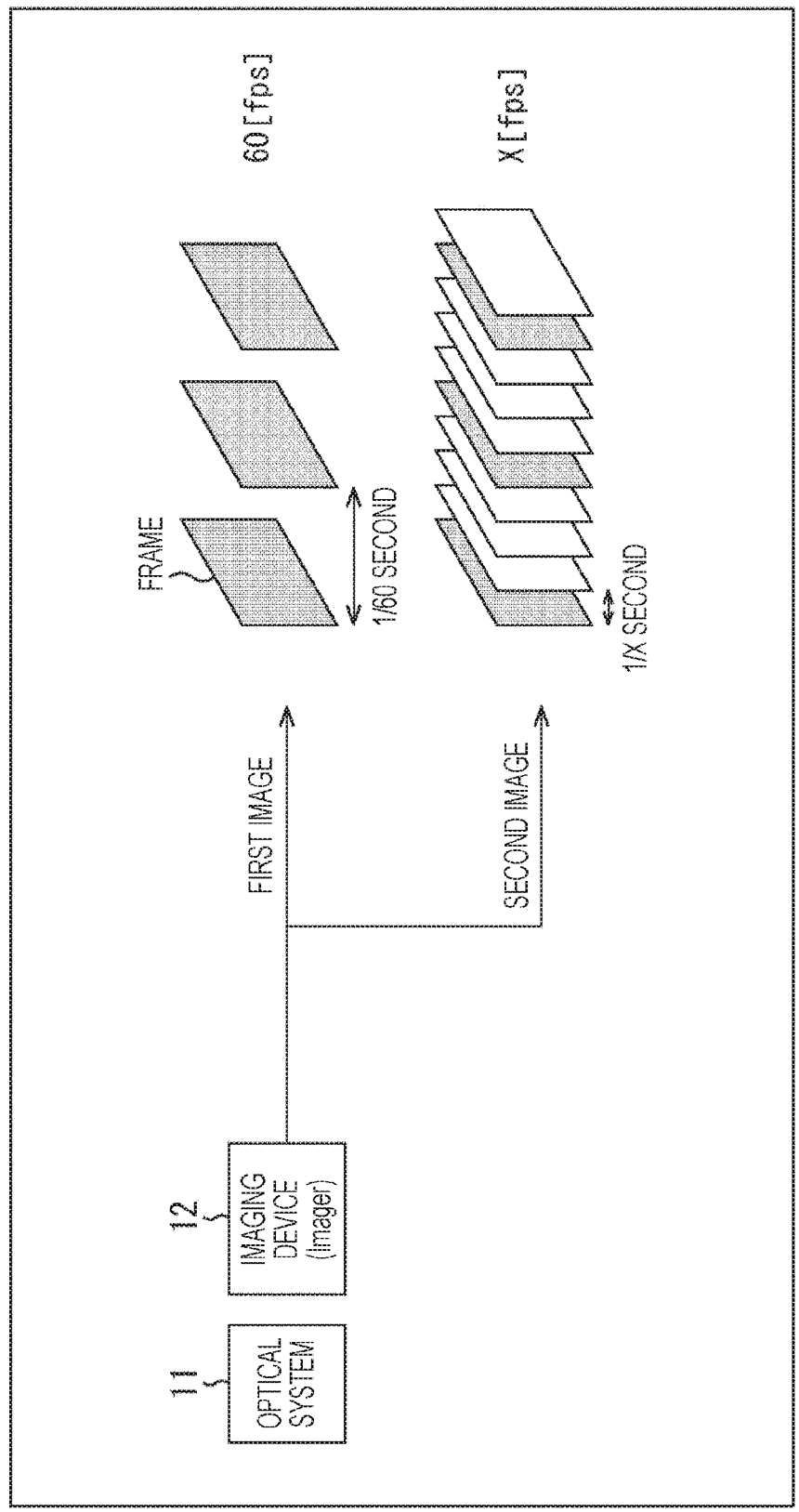
FIG. 2 is a view illustrating an example a first and second images output from an imaging device 12.

FIG. 2 is a view illustrating an example the first and second images output from the imaging device 12.

By performing imaging of the same object at different frame rates, the imaging device 12 can simultaneously output (stream of) the first and second images which are at different frame rates and on which there is the same object.

As a frame rate of the first image, for example, a previously-determined default frame rate such as 60 [fps] can be employed.

A frame rate of the second image can be changed to an arbitrary frame rate X [fps] according to designation by the user.

Note that the default frame rate is not limited to 60 [fps] although 60 [fps] is employed as the default frame rate in FIG. 2.

Also, the frame rate of the first image can be fixed to the default frame rate, or can be changed according to designation by the user similarly to the frame rate of the second image.

In FIG. 2, the frame rate X of the second image is higher than the default frame rate (frame rate of first image).

In this case, a difference may be generated in exposure time (in imaging) of the first and second images according to a difference in frame rates. In a case where there is no difference in exposure time of the first and second images, the first image and the second image can be images with the same image quality in frames at the same time. However, in a case where there is a difference in exposure time of the first and second images, the first image and the second image become images with different image quality in frames at the same time due to the difference in the exposure time.

That is, since the frame rate X of the second image is higher than the default frame rate, in a case where exposure time of the second image is shorter than exposure time of the first image, a signal to noise ratio (S/N) of the first image becomes better than an S/N of the second image with respect to image quality in frames at the same time of the first image and the second image.

Also, since a load of processing of the second image becomes heavy in a case where the frame rate X of the second image is higher than the default frame rate (frame rate of first image), there is a case where the imaging device 12 outputs, as the second image, an image with the number of pixels (resolution) being smaller than that of the first image, or a case where a part of processing with respect to the second image is omitted in the digital signal processing unit 13.

In this case, the second image becomes an image with deteriorated image quality compared to the first image with respect to frames at the same time.

As described above, there is a case where the first and second images become images with different image quality in frames at the same time.

Here, the number of frames imaged in one second in the imaging device 12 is also referred to as an imaging rate and the number of frames displayed in one second on the display device 14 is also referred to as a display rate.

A frame rate of the first image or the second image indicates an imaging rate unless decimation or interpolation of a frame is not performed.

Also, in a case where an image is displayed at a display rate equal to a frame rate (imaging rate) of the image, the image is displayed in real time (real-time reproduction) (1× speed reproduction). In a case where an image is displayed at a display rate lower than a frame rate of the image, the image is displayed slowly (slow reproduction).

Moreover, in a case where an image is displayed at a display rate higher than a frame rate of the image, the image is displayed in a fast-forwarded manner (fast-forward reproduction).

<Processing of Digital Camera>

Figure 3:
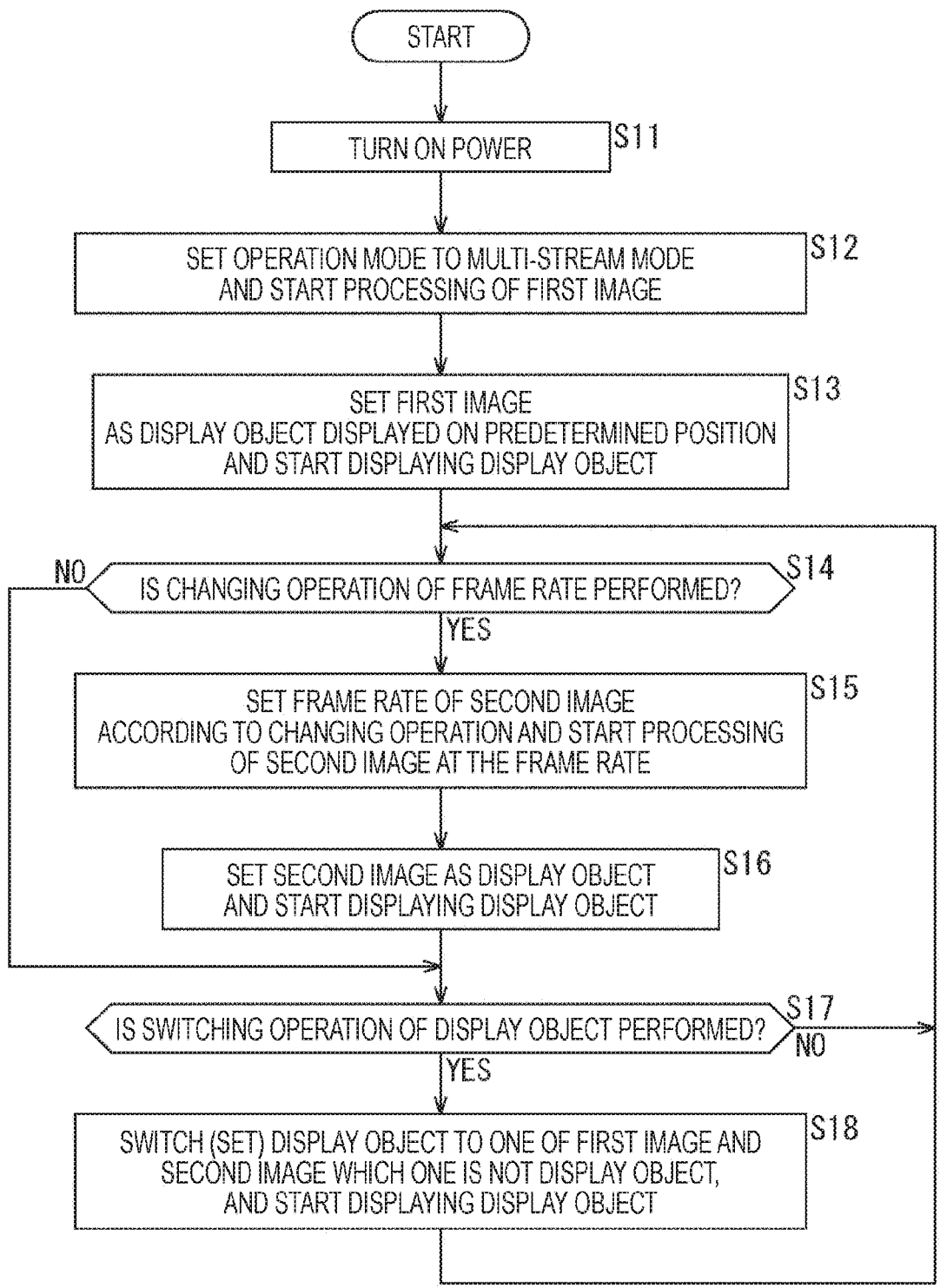
FIG. 3 is a flowchart for describing an example of processing of the digital camera.

FIG. 3 is a flowchart for describing an example of processing of the digital camera in FIG. 1.

In step S11, the control unit 18 waits for operation by a user on the input device 17 to turn the power on and makes the power of the digital camera into an on state, and the processing goes to step S12.

In step S12, the control unit 18 waits for operation by the user on the input device 17 to make an operation mode of the digital camera into a multi-stream mode and sets the operation mode to the multi-stream mode.

Here, the multi-stream mode is a mode in which the imaging device 12 can perform a multi-stream output, that is, here, an output of the first and second images at different frame rates, and in which the digital signal processing unit 13 can perform processing of the first and second images. Moreover, it becomes possible to perform reference rate display control processing (described later) in the multi-stream mode.

Also, in a case where the operation mode is set to the multi-stream mode, a function specific to the multi-stream mode is assigned to operation of a predetermined operation unit included in the input device 17. This point will be described later.

In a case where the operation mode is set to the multi-stream mode, the control unit 18 sets a frame rate (imaging rate) of the first image to a default frame rate and controls the imaging device 12 to output the first image at the default frame rate.

The imaging device 12 starts an output of the first image at the default frame rate according to the control by the control unit 18, and the digital signal processing unit 13 starts processing of the first image.

As described above, in a case where the processing of the first image is started, the processing goes to step S13 from step S12.

In step S13, in the digital signal processing unit 13, the display control unit 35 starts display control of setting the first image as a display object displayed, for example, in a rectangular region that is as a predetermined position in a display region (display screen) of the display device 14 and that has a center of the display region as a center (such as whole display region) and of displaying the display object on the display device 14. With this arrangement, it is started in the display device 14 to display the first image as the display object on the predetermined position in the display region.

Subsequently, the processing goes to step S14 from step S13, and the control unit 18 determines whether the user performs, as operation of the input device 17, changing operation of changing a frame rate (imaging rate) of an image.

In a case where it is determined in step S14 that the changing operation is not performed, the processing goes to step S17 with step S15 and S16 being skipped.

Also, in a case where it is determined in step S14 that the changing operation is performed, the processing goes to step S15.

In step S15, the control unit 18 sets a frame rate (imaging rate) of the second image according to the changing operation and controls the imaging device 12 to output the second image at the frame rate according to the changing operation.

According to the control by the control unit 18, the imaging device 12 starts outputting the second image at the frame rate according to the changing operation, and the digital signal processing unit 13 starts processing of the second image.

As described above, in a case where the processing of the second image is started, the processing goes to step S16 from step S15.

In step S16, in the digital signal processing unit 13, the display control unit 35 starts display control of setting the second image as a display object displayed on the predetermined position in the display region of the display device 14, and of displaying the display object on the display device 14 instead of the image displayed until this. With this arrangement, it is started in the display device 14 to display the second image as the display object on the predetermined position in the display region.

Subsequently, the processing goes to step S17 from step S16, and the control unit 18 determines whether the user performs, as operation of the input device 17, switching operation of switching the display object.

In a case where it is determined in step S17 that the switching operation is not performed, the processing returns to step S14 with step S18 being skipped.

Also, in a case where it is determined in step S17 that the switching operation is performed, the processing goes to step S18.

In step S18, the display control unit 35 starts display control of switching (setting) the display object to one of the first and second images which one is not the display object and of displaying the display object onto the display device 14. With this arrangement, it is started in the display device 14 to display an image, which is not the display object immediately before the switching operation, between the first and second images on the predetermined position in the display region instead of the image displayed until this.

Then, the processing returns to step S14 from step S18, and similar processing is subsequently repeated.

As described above, in a case where a user performs changing operation in the multi-stream mode, a second image at a frame rate according to the changing operation is displayed on a predetermined position in the display device 14.

Thus, only by performing changing operation, the user can check a second image at a frame rate according to the changing operation.

Also, in a case where a user performs switching operation in the multi-stream mode, a display object is switched to an image, which is not the display object, between the first and second images and the display object after the switching is displayed on the display device 14.

Also, in the multi-stream mode, regardless of whether the display object is set to the first or second image, displaying on a predetermined position in the display region of the display device 14 is performed.

Thus, regardless of whether the display object is set to the first or second image, displaying on the same position in the display region of the display device 14 is performed.

As described above, the display object displayed on the same position in the display region of the display device 14 is switched between the first image and the second image by the switching operation.

Here, it is assumed that switching an image by displaying a different image at the same position with a position, in which a certain image is displayed, instead of the image is called flip switching. By the flip switching of the first and second images, the same object that is on each of the first and second images is at the same position. Thus, it is possible to easily grasp a difference in image quality, such as an S/N or resolution, between the first and second images, that is, a degree of image quality of the second image at a frame rate according to the changing operation with the first image at a default frame rate being a reference, for example. Note that in the flip switching, in a case where angles of view of the first and second images are different, the angles of view are conformed by enlargement or reduction of one or both of the first and second images. Thus, the same object on each of the first and second images is displayed at the same position.

As described above, by performing the changing operation and the switching operation, the user can easily check image quality of the second image with reference to the first image and can easily change the frame rate of the second image.

Thus, according to the digital camera in FIG. 1, for example, it is possible to provide an interface useful for the user to easily determine an optimal frame rate such as a frame rate of the second image with which rate image quality acceptable by the user can be kept.

Note that as described above, as a display method of an image with which method the user can grasp a difference in image quality, such as an S/N or resolution, between the first and second images, a method of simultaneously displaying the first and second images side by side vertically or horizontally (hereinafter, also referred to as parallel display method) is considered in addition to a method of performing flip switching and displaying the first and second images on the same position in the display region of the display device 14 (hereinafter, also referred to as flip switching method).

However, in the parallel display method, it is necessary to provide a display device similar to the display device 14 in addition to the display device 14, and to display a first image on the display device 14 and to display a second image on the newly-provided display device, for example. Alternatively, in the parallel display method, it is necessary to divide the display region of the display device 14 into two small regions and to display a first image on one small region and to display a second image on the other display region.

In a case where a display device similar to the display device 14 is newly provided in addition to the display device 14, a size of a digital camera is increased. In a case where the display region of the display device 14 is divided into two small regions, sizes of displayed first and second images become small and it becomes difficult to grasp a difference in image quality between the first and second images.

On the other hand, according to the flip switching method, it is possible to intuitively (easily) grasp a difference in image quality between the first and second images without the above-described increase in a size of a digital camera and decrease in sizes of displayed first and second images.

Note that in a case where two images on which there is the same object and in which an S/N or resolution is different are displayed on an LCD as a display screen of a personal computer (PC), it is possible to actually check that a difference in image quality at the same position is recognized more and even a slight difference in image quality is extremely easily grasped in a case where the flip switching is performed and two images are displayed at the same position compared to a case where two images are displayed side by side.

Here, in FIG. 3, it is assumed that the flip switching is performed according to the switching operation by the user. However, in addition to performance according to the switching operation, the flip switching can be performed periodically or can be performed at an event point, for example.

Also, in the multi-stream mode, first and second images are displayed in real time in a case other than reference rate display control processing (described later).

For example, here, to simplify the description, it is assumed that a display rate of the display device 14 is a fixed rate and is equal to a frame rate (imaging rate) of a first image.

In a real-time display of the first image, the first image is displayed as it is at the display rate on the display device 14.

In a real-time display of a second image, the second image is displayed at the display rate on the display device 14 after decimation is performed in such a manner that a frame rate becomes equal to the display rate. For example, in a case where a frame rate of the first image is 60 [fps] and a frame rate X of the second image is 240 [fps], the second image is displayed at the display rate on the display device 14 after decimation of the number of frames into ¼=60/240 is performed and the frame rate is made equal to 60 [fps] that is the display rate.

Note that as described above, in a case where the frame rate X of the second image is higher than the frame rate of the first image, the second image is displayed in real time by the decimation of a frame. However, in a case where the frame rate X of the second image is lower than the frame rate of the first image, the second image can be displayed in real time by interpolation of a frame.

Also, in a case where the display rate of the display device 14 is variable, it is possible to perform a real-time display without the above-described decimation or interpolation of a frame by displaying the first image at a display rate equal to the frame rate of the first image and displaying the second image at a display rate equal to the frame rate of the second image. As described above, in a case where a second image is displayed at a display rate equal to a frame rate of the second image, it is possible to visually and easily check smoothness of the second image at each frame rate by changing the frame rate of the second image (imaging rate at which second image is imaged by operation device 12).

Moreover, in FIG. 3, it is assumed that a frame rate of a second image between first and second images is changed by changing operation in order to simplify the description. However, changing of a frame rate according to the changing operation can be performed with respect to an image, which is a display object when the changing operation is performed, between the first and second images.

Also, in FIG. 3 (similar in the following), it is assumed that changing of a frame rate or flip switching is performed with respect to images of two streams that are the first and second images. However, changing of a frame rate or flip switching can be performed with respect to images of three streams or more.

In changing of a frame rate with respect to the images of three streams or more, for example, a frame rate of an image of one stream which image is a display object among the images of three streams or more can be performed.

Also, in flip switching with respect to images of three streams or more, for example, it is possible to order the images of three streams or more in a loop manner, and to set the images of three streams or more as a display object in order according to the ordering each time the switching operation is performed. For example, the order of ordering of the images of three streams or more can be set in a digital camera previously or can be set according to operation with respect to the input device 17 by the user.

<Changing of Frame Rate>

Figure 4:
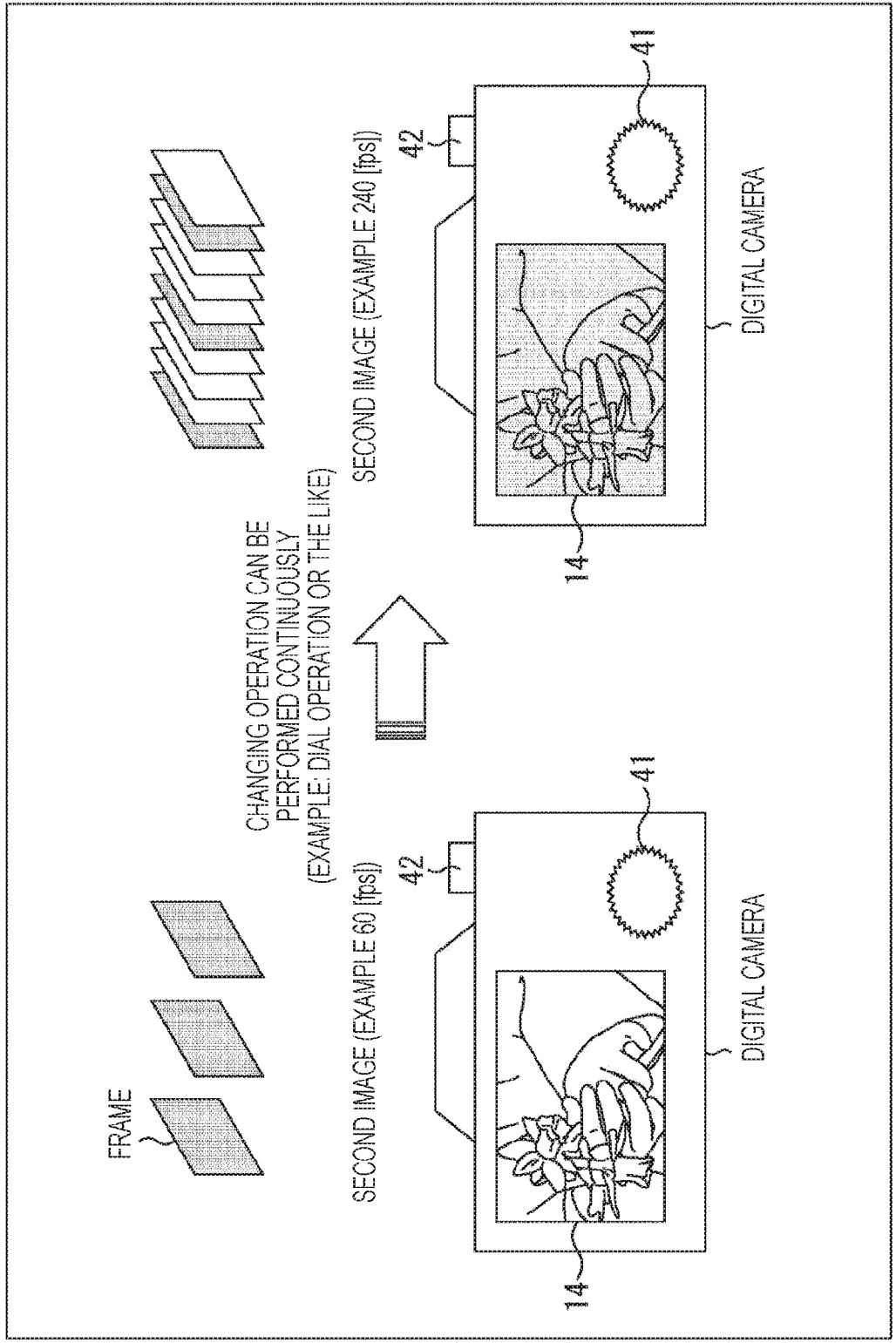
FIG. 4 is a view for describing an example of changing a frame rate of the second image according to changing operation.

FIG. 4 is a view for describing an example of changing a frame rate of a second image according to changing operation.

In FIG. 4, the display device 14 as a display panel is provided on a rear surface of the digital camera.

Moreover, in the digital camera, a dial 41 is provided on a lower right side of the display device 14 and a shutter (record) button 42 is provided at a right end of an upper surface.

In an operation mode other than the multi-stream mode, for example, rotation operation of the dial 41 is assigned to a function other than changing of a frame rate. In the multi-stream mode, for example, rotation operation of the dial 41 is assigned to changing of a frame rate.

Pressing operation of the shutter button 42 is performed in starting or ending recording of a moving image, photographing (recording) a still image as a photograph, or the like.

In FIG. 4, an operation mode of the digital camera is the multi-stream mode. Then, a second image between first and second images is set as a display object, and the second image as the display object is displayed on a predetermined position in a display region of the display device 14 provided on the rear surface of the digital camera.

When the user performs rotation operation of the dial 41, a frame rate (imaging rate) of the second image displayed in real time as the display object on the display device 14 is changed with the rotation operation as the changing operation.

That is, according to a rotation direction and a rotation amount of the rotation operation of the dial 41 as the changing operation, a frame rate of a second image imaged by the imaging device 12 is continuously increased/decreased in 1 [fps] unit, for example. In FIG. 4, the frame rate of the second image is continuously changed from 60 [fps] to 240 [fps] according to the rotation operation of the dial 41.

Thus, by performing the rotation operation of the dial 41 as the changing operation, the user can visually and easily check a change in image quality of the second image of a case where the frame rate is changed, that is, for example, a decrease in luminance and a deterioration in an S/N along with an increase in the frame rate.

Here, in FIG. 4, the display rate of the display device 14 is 60 [fps]. Thus, in the display control unit 35, a second image at a frame rate of 60 [fps] is displayed in real time without interpolation or decimation of a frame. On the other hand, a second image after the changing operation, that is, a second image at a frame rate of 240 [fps] is displayed in real time by decimation of the number of frames into ¼.

In FIG. 4, in the display control unit 35, by decimation of a frame of the second image at the frame rate of 240 [fps], only frames at the same time with frames of the second image at the frame rate of 60 [fps] are displayed on the display device 14, for example.

Note that as the changing operation, arbitrary one operation can be employed other than the rotation operation of the dial 41.

Here, the "one operation" means predetermined operation of a case where the predetermined operation can be performed without performance of different operation, that is, can be performed directly.

For example, in a case where a predetermined item is selected, if it is necessary to perform operation of displaying a menu and to perform operation of selecting a predetermined item from the menu displayed by the operation, the operation of selecting a predetermined item does not correspond to the "one operation." This is because it is necessary in this case to perform the operation of displaying a menu in order to perform the operation of selecting a predetermined item.

In the present embodiment, the rotation operation of the dial 41 is assigned to changing of a frame rate, and the dial 41 is exposed to the rear surface of the digital camera. Thus, the rotation operation of the dial 41 corresponds to one operation.

As described above, by employing, as the changing operation, the rotation operation of the dial 41 which operation is one operation, it is possible for the user to immediately perform the changing operation, to change a frame rate of a second image, and to check image quality of a second image after the frame rate is changed when this occurs to the user.

Note that in FIG. 4, a frame rate of the second image displayed as the display object on the display device 14 is changed according to the changing operation. However, in a case where a first image is displayed as the display object on the display device 14, for example, it is possible to change a frame rate of the first image that is the display object or to change the display object from the first image to a second image at the same frame rate with the first image and to change a frame rate of the second image that is the display object after the change.

Figure 5:
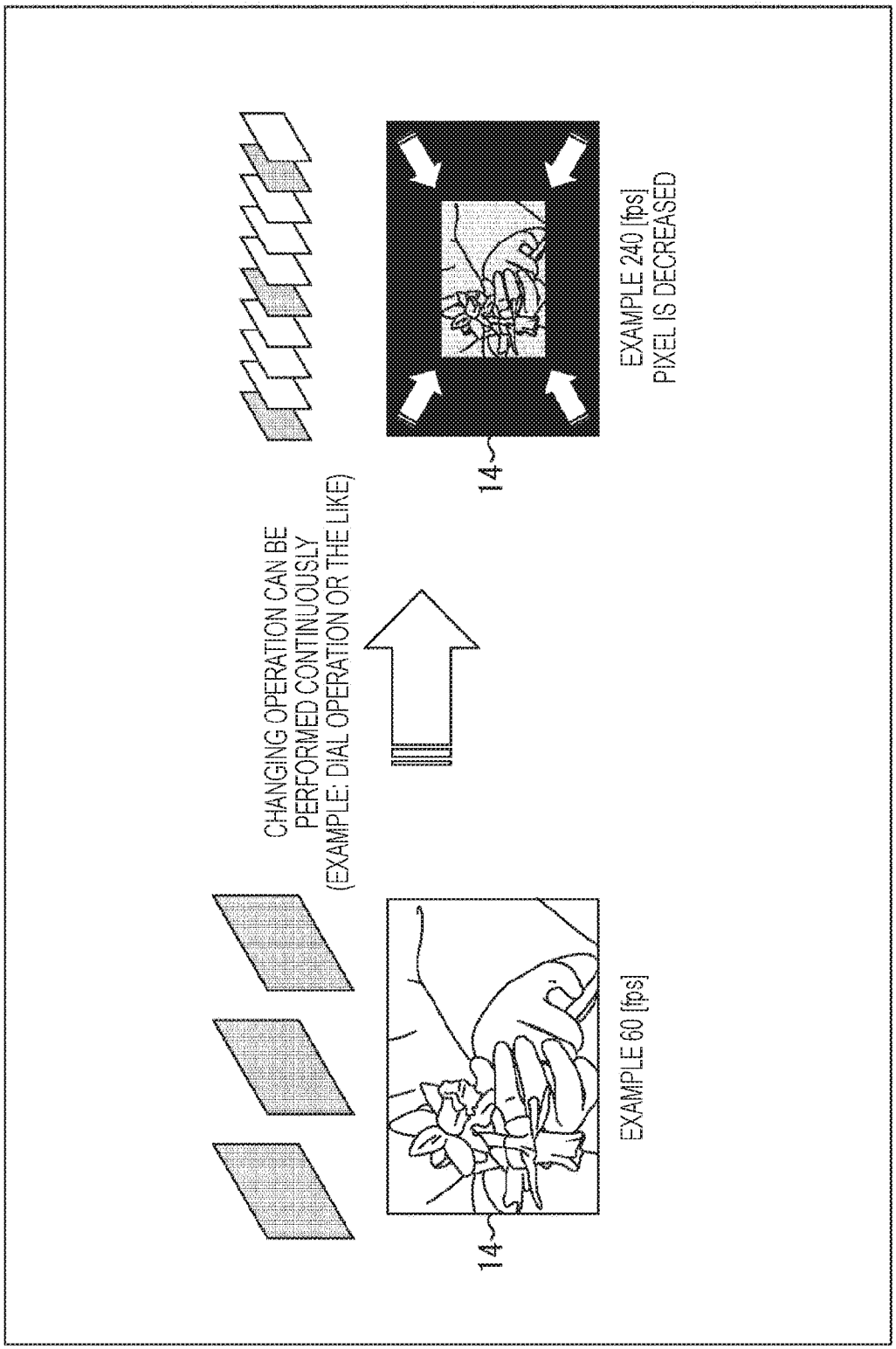
FIG. 5 is a view for describing a different example of changing a frame rate of the second image according to changing operation.

FIG. 5 is a view for describing a different example of changing a frame rate of the second image according to the changing operation.

As described in FIG. 4, in the multi-stream mode, a frame rate of a second image imaged by the imaging device 12 is continuously changed (increased/decreased) according to the rotation operation of the dial 41 as the changing operation.

As described above, in a case where the frame rate of the second image is changed, specifically, in a case where the frame rate is changed to be higher in the imaging device 12, a processing amount in the imaging device 12 is increased. Thus, in order to control the increase in the processing amount, there is a case where the number of pixels is decreased as the frame rate of the second image becomes high.

That is, for example, in the imaging device 12, it is possible to decrease the number of horizontal and vertical pixels in the second image by decreasing an angle of view of an image imaged by an image sensor or performing decimation of a pixel used for imaging in the image sensor (pixel for acquiring pixel value included in image) as the frame rate of the second image becomes a high frame rate.

In this case, in the display control unit 35, it is possible to display a second image on the display device 14 in a size corresponding to the number of pixels of the second image.

As described above, a second image is displayed in a size corresponding to the number of pixels thereof. Thus, while changing a frame rate of the second image by the changing operation, the user can intuitively recognize a change in the number of pixels of the second image associated with the changing of the frame rate.

Here, in FIG. 5, similarly to the case of FIG. 4, a frame rate of the second image is continuously changed from 60 [fps] to 240 [fps] according to the rotation operation of the dial 41.

For example, in a case where the number of horizontal and vertical pixels of a second image is decreased as a frame rate of the second image becomes a high frame rate in the imaging device 12, if the frame rate of the second image is continuously changed from 60 [fps] to 240 [fps] according to the rotation operation of the dial 41, a size of the second image displayed on the display device 14 becomes gradually smaller as the frame rate of the second image is continuously changed from 60 [fps] to 240 [fps] as illustrated in FIG. 5.

<Flip Switching>

Figure 6:
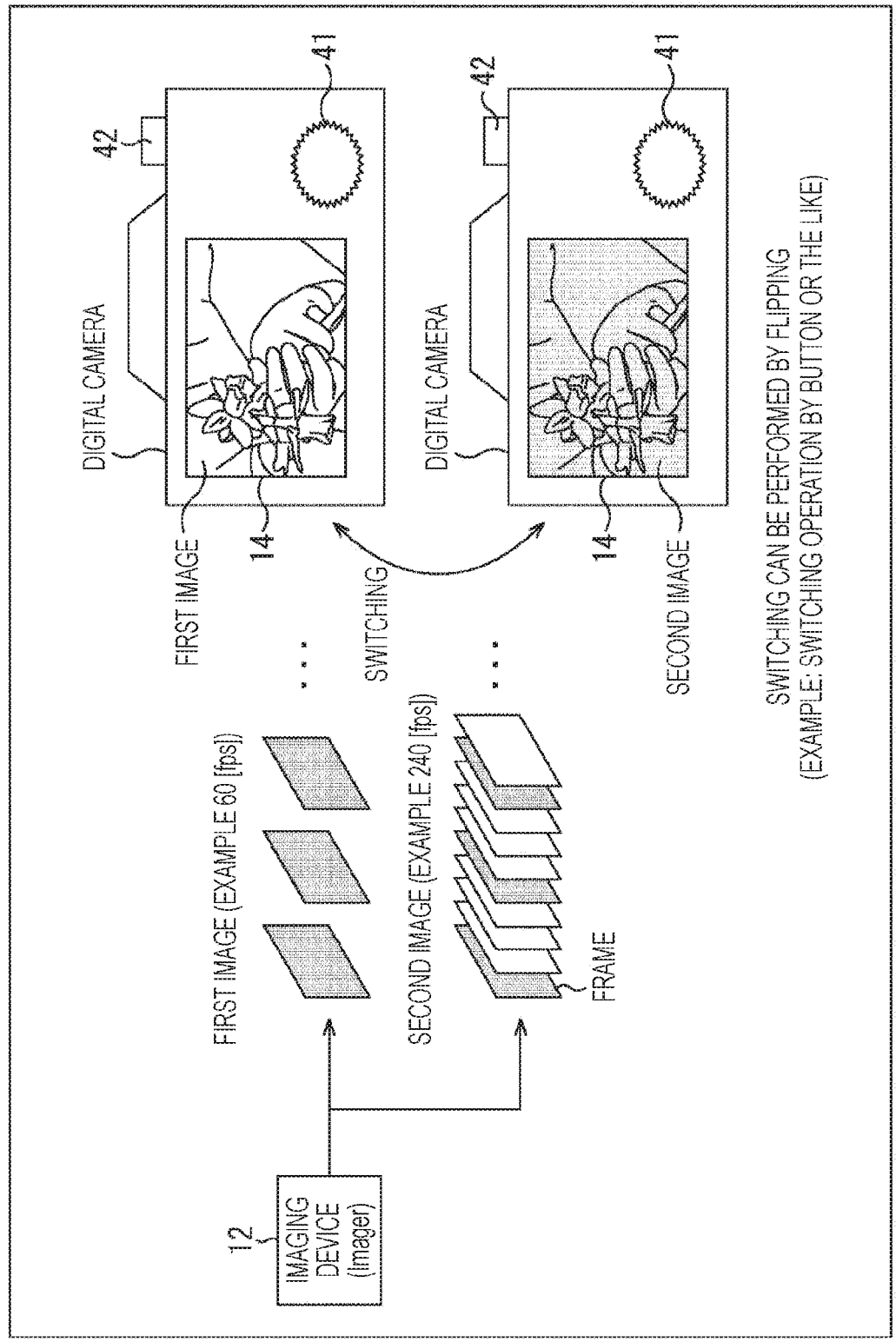
FIG. 6 is a view for describing an example of flip switching according to switching operation.

FIG. 6 is a view for describing an example of flip switching according to switching operation.

In the multi-stream mode, for example, pressing operation of the dial 41 is assigned to the flip switching in a case where the pressing operation of the dial 41 is possible. Alternatively, for example, one operation such as tapping on an arbitrary position in the display region of the display device 14 or tapping on a peripheral part of the display region is assigned to the flip switching.

In FIG. 6, an operation mode of the digital camera is the multi-stream mode. Then, in the imaging device 12, imaging of a first image at a frame rate of 60 [fps] and a second image at a frame rate of 240 [fpf] is performed, and the first and second images are output.

In the digital camera, with one image between the first and second images as a display object, the display object is displayed on a predetermined position in the display region of the display device 14 (whole display region in FIG. 6).

For example, in a case where a user performs, as the switching operation, the pressing operation of the dial 41 or tapping on the display region of the display device 14, flip switching of switching a display object from an image currently displayed on the display device 14 to the other between the first and second images in the display control unit 35 and of displaying the display object after the switching on a predetermined position in the display region of the display device 14 is performed each time the switching operation is performed.

Thus, by performing the switching operation, the user can visually and easily check a difference in image quality between the first image at 60 [fps] and the second image at 240 [fpf], that is, for example, a degree of inferiority of an S/N of the second image at 240 [fpf] with respect to that of the first image at 60 [fps].

Here, in FIG. 6, since a display rate of the display device 14 is 60 [fps], the first image at (frame rate being) 60 [fps] is displayed in real time without interpolation or decimation of a frame. On the other hand, the second image at 240 [fps] is displayed in real time by decimation of the number of frames into ¼.

In FIG. 6, by decimation of a frame of the second image at 240 [fps], for example, only frames at the same time with frames of a second image at a frame rate of 60 [fps] are displayed on the display device 14.

Note that as the switching operation, arbitrary one operation can be employed other than the pressing operation of the dial 41 or tapping on the display region of the display device 14.

By employing, as the switching operation, the pressing operation of the dial 41 or the tapping on the display region of the display device 14, the pressing operation or the tapping being one operation, it is possible for the user to immediately perform the switching operation, to immediately switch a display on the display device 14 from one image between the first and second images to the other image, and to check a difference in image quality between the first and second images when this occurs to the user.

Figure 7:
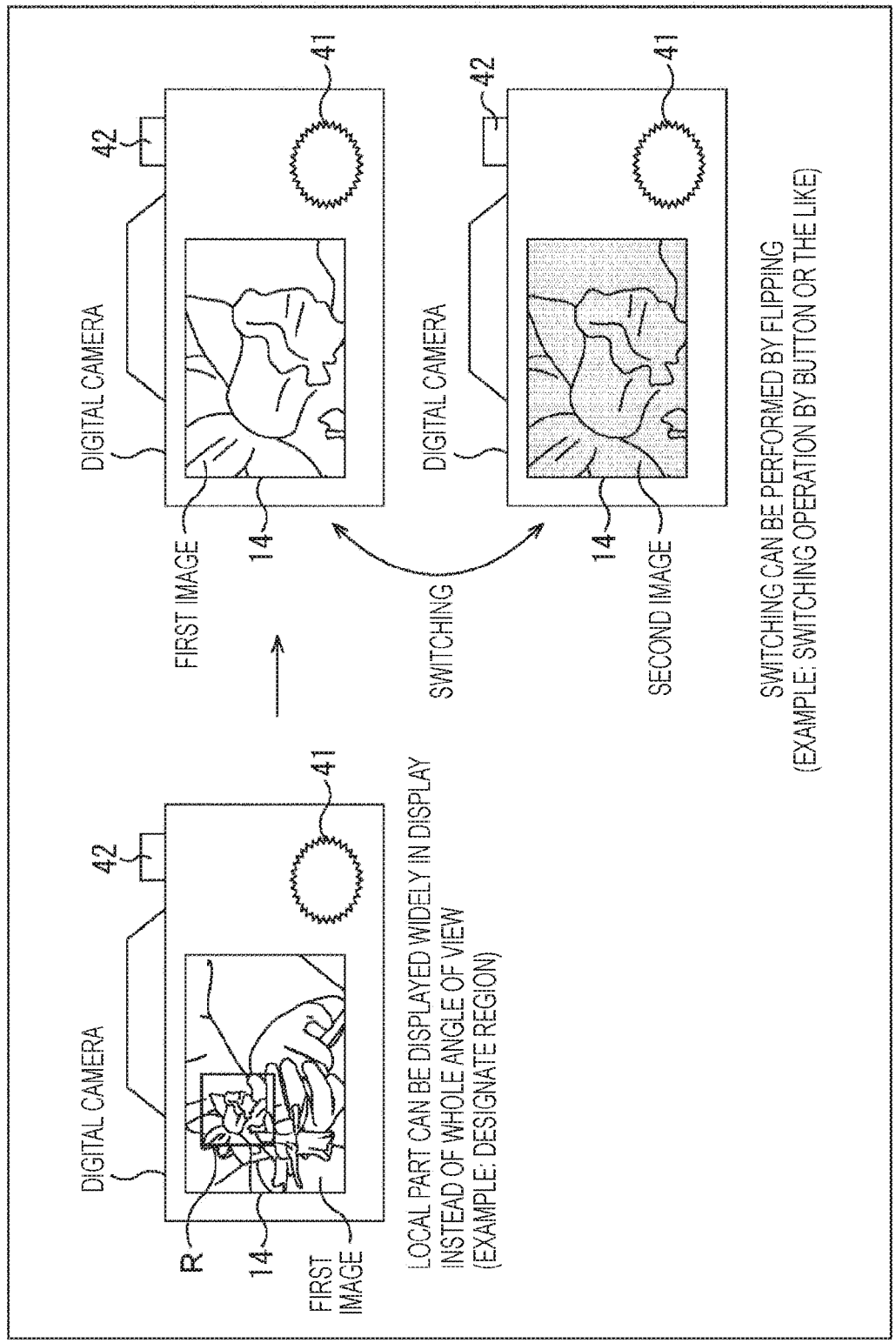
FIG. 7 is a view for describing a different example of flip switching according to switching operation.

FIG. 7 is a view for describing a different example of flip switching according to switching operation.

In a multi-stream mode, for example, double-tapping or the like at an arbitrary position in the display region of the display device 14 is assigned to enlargement of an image, which is displayed on the display device 14, as enlarging operation of enlarging the image displayed on the display device 14.

Similarly to FIG. 6, an operation mode of the digital camera is the multi-stream mode in FIG. 7. Then, in the imaging device 12, imaging of a first image at a frame rate of 60 [fps] and a second image at a frame rate of 240 [fpf] is performed, and the first and second images are output.

In the digital camera, in a case where one image between the first and second images is a display object and the display object is displayed on the display region of the display device 14, if a user performs, for example, double-tapping on the display region of the display device 14 as the enlarging operation, a part of the image displayed on the display device 14 is enlarged in the display control unit 35. That is, a predetermined region R that has, as a center, a position on which the double-tapping is performed on the display region of the display device 14 is enlarged into an enlarged image and displayed on the display device 14.

Then, if the user performs the switching operation in a state in which the enlarged image is displayed on the display device 14, flip switching of the first and second images which switching is similar to that of the case of FIG. 6 is performed with enlargement of the image being kept each time the switching operation is performed.

Thus, by performing the switching operation after the enlarging operation, the user can visually and easily check a difference in image quality in detail parts of the first and second images.

Note that as the enlarging operation, arbitrary one operation can be employed other than tapping of the double-tapping.

By employing, as the enlarging operation, the double-tapping that is one operation, it is possible for the user to immediately perform the enlarging operation, to enlarge an intended part of the image displayed on the display device 14, and to check a difference in image quality in the intended part of the first and second images.

Figure 8:
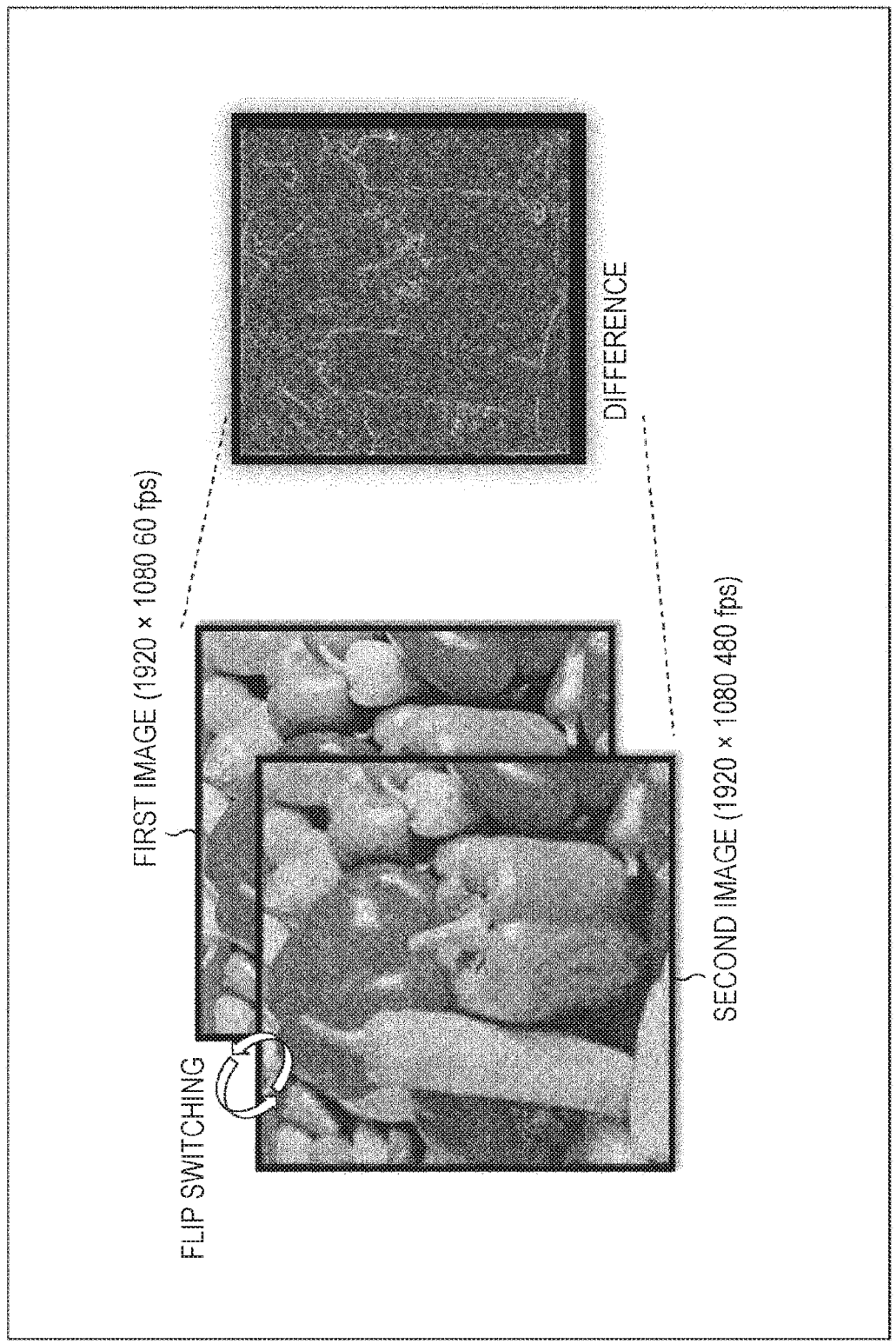
FIG. 8 is a view schematically illustrating flip switching of the first and second images.

FIG. 8 is a view schematically illustrating flip switching of the first and second images.

In the flip switching, a display on a predetermined position of the display device 14 is switched from one image between the first and second images to the other image.

Thus, since the first and second images are displayed on the same position, a user can extremely easily check a difference between the first and second images by repeating the flip switching.

Here, in FIG. 8 (similar in FIGS. 9A and 9B described later), an image with a horizontal side×vertical side being 1920×1080 pixels as the number of pixels in imaging is employed as each of the first and second images. Frame rates of the first and second images are respectively 60 [fps] and 480 [fps], and it is possible to slightly check that an S/N of the first image at a low frame rate is higher than that of the second image at a high frame rate.

FIGS. 9A and 9B are views for describing a case where flip switching of the first and second images is performed and a case where the first and second images are displayed by a parallel display method.

FIG. 9A is a view for describing the flip switching of the first and second images.

In the flip switching, the first and second images are alternately displayed on the same position. By vertically superimposing the first image and the second image in A of FIG. 19 and by repeating flipping and flipping back of an image on an upper side, it is possible to artificially experience the flip switching.

According to the flip switching, the same object that is on the first and second images is displayed at the same position. Thus, a difference between the first and second images, specifically, a difference in image quality such as an S/N, resolution, color unevenness, or brightness is extremely easily understood.

Also, for example, a request from a professional user of filming such as a filmmaker to make it easier to distinguish a difference in image quality in a pixel unit or a fine unit close to a pixel unit is getting increased. According to the flip switching, it is possible to respond to such a request from a user.

In FIG. 9B, a state in which the first and second images are displayed by the parallel display method is illustrated.

Here, if it is assumed that an image is displayed on a display region of a predetermined size, it is possible to display each of the first and second images on the whole display region in the flip switching. However, in a case where the first and second images are displayed horizontally side by side in the parallel display method, a horizontal and vertical display size of each of the first and second images becomes ½ of the size of the display region at maximum.

As described above, since the first and second images become small in the parallel display method, it becomes difficult to recognize a difference between the first and second images compared to the flip switching.

Moreover, in the parallel display method, it becomes difficult to recognize a difference between the first and second images compared to the flip switching since the same object on the first and second images is displayed at different positions.

<Reference Rate Display Control Processing>

Figure 10:
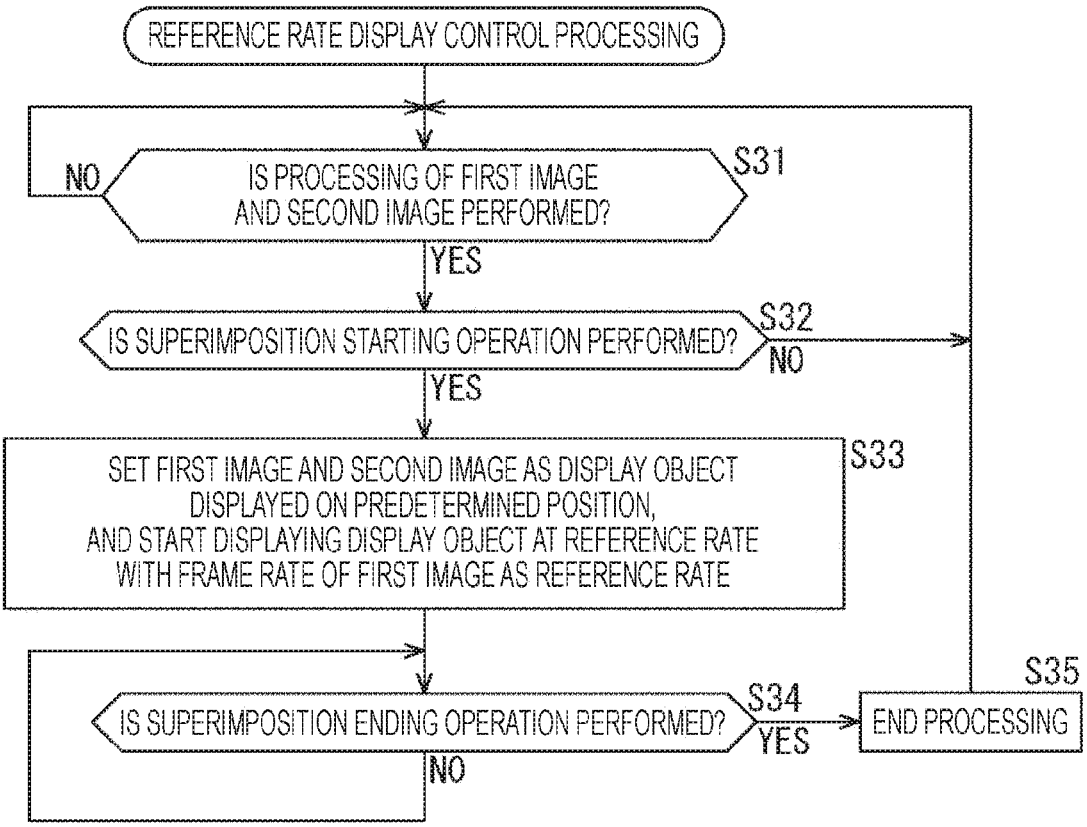
FIG. 10 is a flowchart for describing an example of reference rate display control processing.

FIG. 10 is a flowchart for describing an example of the reference rate display control processing.

In the multi-stream mode, the reference rate display control processing is performed in addition to changing of a frame rate or flip switching of an image displayed on the display device 14, the changing or switching being described with reference to FIGS. 4, 5, 6, 7, 8, 9A, and 9B.

In the reference rate display control processing, at a display rate equal to a frame rate of one image between the first image and the second image, the other image is displayed.

Here, in order to simplify the description, it is assumed that a frame rate of the first image is a reference rate. In the reference rate display control processing, a display rate of the display device 14 is fixed to the reference rate (or frame rate of first image is fixed to display rate of display device 14), and the first and second images are displayed at the reference rate.

In this case, the first image is displayed in real time (real-time reproduction).

On the other hand, the second image is displayed slowly (slow reproduction) in a case where a frame rate thereof is higher than that of the first image. Also, the second image is displayed in a fast-forwarded manner (fast-forward reproduction) in a case where a frame rate thereof is lower than that of the first image.

In the reference rate display control processing, the display control unit 35 determines in step S31 whether processing of the first and second images is performed in the digital camera, that is, whether the digital camera is in a state in which the first and second images can be displayed.

In a case where it is determined in step S31 that the processing of the first and second images is performed, the processing goes to step S32 and the display control unit 35 determines whether superimposition starting operation that is operation of starting a superimposition display of the first and second images is performed.

Here, as the superimposition starting operation, for example, half-pressing operation on the shutter button 42 or different one operation can be employed. In a case where the half-pressing operation on the shutter button 42 is employed as the superimposition starting operation, the half-pressing operation on the shutter button 42 is assigned to the superimposition starting operation in setting of the multi-stream mode.

In a case where it is determined in step S32 that the superimposition starting operation is not performed, the processing returns to step S31 and similar processing is repeated thereafter.

Also, in a case where it is determined in step S32 that the superimposition starting operation is performed, the proceeding goes to step S33 and the display control unit 35 sets both of the first and second images as display objects. Then, with the frame rate of the first image as a reference rate, the display control unit 35 starts a superimposition display of the first and second images, which are the display objects, at the reference rate. With this arrangement, in the display device 14, the superimposition display of the first and second images is performed at the reference rate at the same position in the display region.

Here, the superimposition display of the first and second images can be performed, for example, by composition of the first and second images by alpha blending and displaying of a composite image acquired by the composition. For example, a blending rate (so-called a) in composition of the first and second images by the alpha blending can be set previously or can be set according to operation by a user.

Subsequently, the processing goes to step S34 from step S33, and the display control unit 35 determines whether superimposition ending operation that is operation of designating ending of the superimposition display of the first and second images is performed.

Here, as the superimposition ending operation, for example, release of the half-pressing operation on the shutter button 42 or different one operation can be employed. In a case where release of the half-pressing operation on the shutter button 42 is employed as the superimposition ending processing, the release of the half-pressing operation on the shutter button 42 is assigned to the superimposition ending operation in setting of the multi-stream mode.

In a case where it is determined in step S34 that the superimposition ending operation is not performed, the processing returns to step S34 and similar processing is repeated thereafter.

Also, in a case where it is determined in step S34 that the superimposition ending operation is performed, the processing goes to step S35, and the display control unit 35 performs end processing of ending the superimposition display of the first and second images.

For example, in the end processing, a display object is switched (set) from the first and second images to the first image, which is a display object immediately before the superimposition starting operation is performed, and is displayed on the display device 14.

Subsequently, the processing returns to step S31 from step S35, and similar processing is repeated thereafter.

As described above, since the first and second images are displayed at the reference rate in the reference rate display control processing, it is possible to visually and easily grasp a degree of slowness or fastness of a slow or fast-forward display of the second image by comparison with a real-time display of the first image.

Note that in FIG. 10, in a case where the superimposition starting operation is performed, the superimposition display at the reference rate is performed with both of the first and second images as display objects. However, as a display of the first and second images at the reference rate in the reference rate display control processing, a display by the above-described flip switching can be employed instead of the superimposition display.

Also, with respect to the reference rate display control processing, not only in a case where first and second images having a difference in image quality in frames at the same time are objects but also in a case where first and second images with no difference in image quality in frames at the same time are objects, a degree of slowness or fastness of the second image can be checked.

Moreover, operation that is not one operation can be employed as the superimposition starting operation or the superimposition ending operation. However, by employing one operation such as half-pressing of the shutter button 42 or release of the half-pressing as the superimposition starting operation or the superimposition ending operation, it is possible for a user to immediately perform the superimposition starting operation or the superimposition ending operation and to check a degree of slowness or fastness of the second image without stress (no waiting time) when this occurs to the user.

Figure 11:
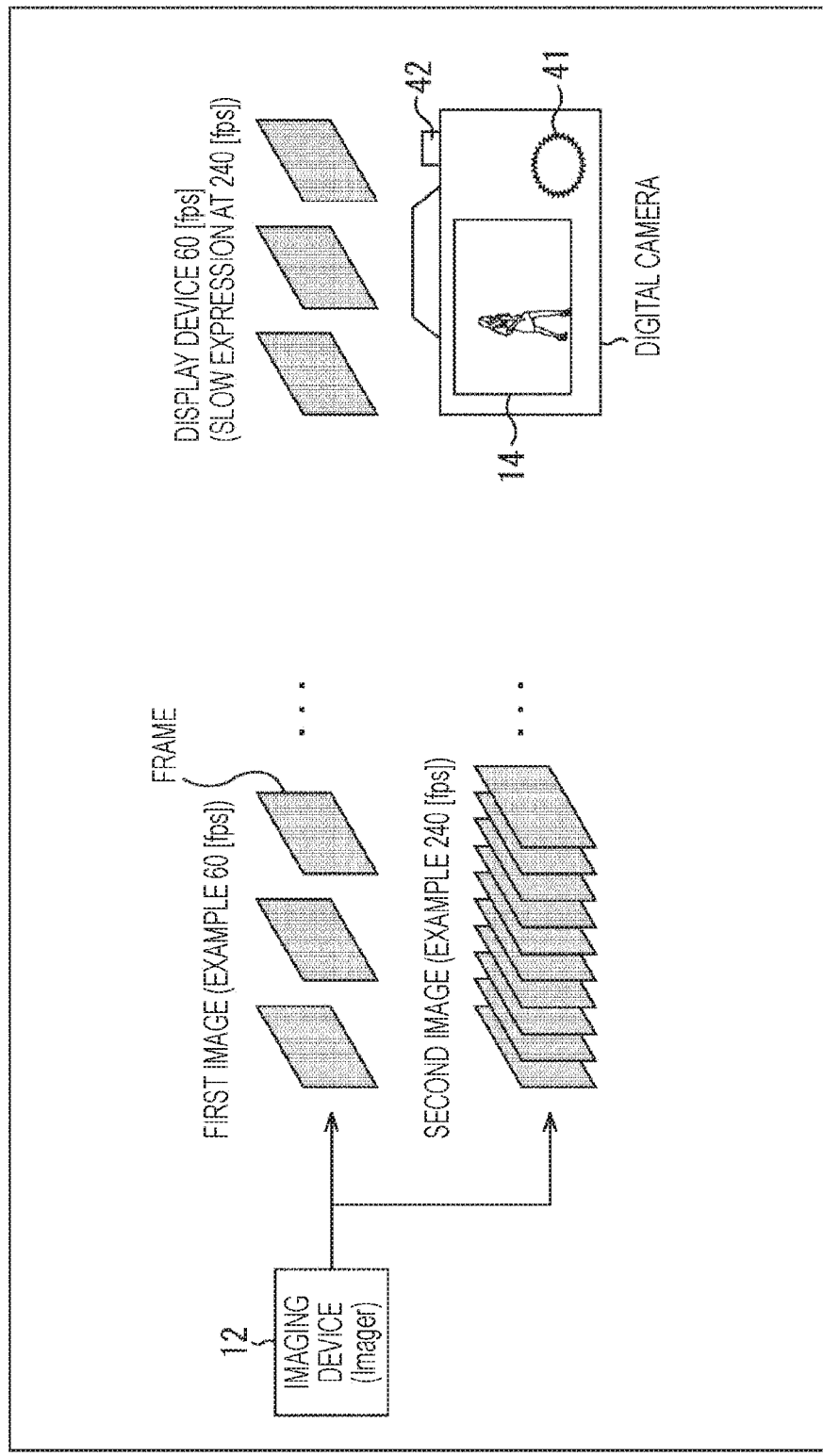
FIG. 11 is a view for describing the reference rate display control processing.

FIG. 11 is a view for describing the reference rate display control processing.

In FIG. 11, a first image at 60 [fps] and a second image at 240 [fps] are imaged and output in the imaging device 12.

In a case where the reference rate display control processing is performed with the first image at 60 [fps] and the second image at 240 [fps] described above being objects, the first and second images are displayed with a frame rate of the first image as a reference rate. Thus, the first image is displayed in real time and the second image is displayed slowly.

Note that in the reference rate display control processing, the first and second images can be displayed with a frame rate of the second image as a reference rate instead of the frame rate of the first image. In this case, as described above, in a case where the reference rate display control processing is performed with the first image at 60 [fps] and the second image at 240 [fps] as objects, the first image is displayed in a fast-forwarded manner and the second image is displayed in real time.

Here, in a case where the first image is displayed in a fast-forwarded manner, it is necessary to display the first image after buffering of a frame of the first image for an amount necessary for the fast-forwarding. Thus, in a case where a fast-forward display is performed, a delay for performance of the buffering is generated.

FIGS. 12A and 12B are views for describing a display example of a display of the first and second images in the reference rate display control processing.

In FIGS. 12A and 12B, similarly to the case of FIG. 11, a first image at 60 [fps] and a second image at 240 [fps] are imaged and output in the imaging device 12. Moreover, the first image between the first and second images is set as a display object and displayed on the display device 14.

A person walking from the left to the right is on the first and second images as an object.

Here, the object on each of the first and second images is the same object. However, the object on the first image is also described as an object obj1 and the object on the second image is also described as an object obj2.

In FIG. 12A, a display example of the display device 14 of a case where operation is not specifically performed in a case where a first image at 60 [fps] and a second image at 240 [fps] are imaged and the first image is set as a display object and displayed on the display device 14 in the imaging device 12 is illustrated.

In this case, while being set as the display object, the first image is displayed with the frame rate of the first image as a display rate. Thus, since the first image is displayed in real time on the display device 14, the display becomes a scene in which the object obj1 on the first image walks in real time.

In FIG. 12B, a display example of the display device 14 of a case where superimposition starting operation is performed in a case where a first image at 60 [fps] and a second image at 240 [fps] are imaged and the first image is set as a display object and displayed on the display device 14 in the imaging device 12 is illustrated.

In this case, the first and second images are set as display objects, and a superimposition display is performed with the frame rate of the first image as a display rate. Thus, since the first image is displayed in real time and the second image is displayed slowly on the display device 14, the display becomes a display where a scene in which the object obj1 on the first image walks in real time and a scene in which the object obj2 on the second image walks slowly are superimposed.

By seeing such a display, a user can compare a real-time movement of the object obj1 on the first image and a slow movement of the object obj2 on the second image and can intuitively grasp a degree of slowness of the movement of the object obj2 that is secondly on the image.

If superimposition ending operation is performed in N (>0) seconds after the superimposition starting operation is performed, the end processing by the display control unit 35 is performed as described in FIG. 10. In the end processing, the first image that is the display object immediately before the superimposition starting operation is performed is set again as the display object and displayed on the display device 14.

Here, in the end processing, the first image can be immediately set as the display object and displayed on the display device 14.

In this case, immediately after the superimposition ending operation is performed, the display on the display device 14 is changed to the scene in which the object obj1 on the first image walks in real time from the display where the scene in which the object obj1 on the first image walks in real time and the scene in which the object obj2 on the second image walks slowly are superimposed.

Also, in the end processing, reproduction of one image at a low frame rate between the first and second images on the display device 14 can be stopped, and reproduction of the other image on the display device 14 can be stopped after the reproduction of the other image on the display device 14 is continued to a frame at the same time with a frame in which the reproduction of the one image is stopped.

That is, in the end processing, after reproduction of the first image on the display device 14 is stopped and reproduction of the second image on the display device 14 is continued to a frame at the same time with a frame in which the reproduction of the first image is stopped, the reproduction of the second image on the display device 14 can be stopped.

Then, subsequently, the first image can be set as a display object and displayed on the display device 14.

In this case, since the reproduction of the first image on the display device 14 is stopped immediately after the superimposition ending operation is performed. Thus, with respect to the first image, a frame of when the superimposition ending operation is performed is kept displayed as a still image.

On the other hand, since the reproduction of the second image on the display device 14 is continued, the scene in which the object obj2 walks slowly is kept displayed with respect to the second image.

Then, the reproduction of the second image on the display device 14 is continued to a frame at the same time with a frame, in which the reproduction of the first image is stopped, and is stopped. Subsequently, the first image is set as a display object and displayed on the display device 14.

Thus, the reproduction of the second image on the display device 14 is continued until the object obj2 on the second image overlaps with the object obj1 on the first image displayed as the still image. Subsequently, the display on the display device 14 is switched to the first image. In this case, a scene on the first image displayed on the display device 14 is switched from the scene of when the superimposition ending operation is performed to a scene on the first image that is currently imaged by the imaging device 12.

Here, according to the above-described end processing, it is displayed on the display device 14 whether the object obj2 on the second image is in a scene of catching up with the object obj1 on the first image displayed as the still image. Hereinafter, such a display is also referred to as a following display.

FIGS. 13A and 13B are views for describing an example of the following display.

In FIGS. 13A and 13B, similarly to the case of FIGS. 12A and 12B, a first image at 60 [fps] and a second image at 240 [fps] are imaged in the imaging device 12. Then, the first image is set as a display object and displayed on the display device 14.

Moreover, in FIGS. 13A and 13B, similarly to the case of FIGS. 12A and 12B, a person walking from the left to the right is on the first and second images respectively as the objects obj1 and obj2.

In FIG. 13A, a display example of the display device 14 of a case where operation is not specifically performed in a case where the first image is set as a display object and displayed on the display device 14 is illustrated.

In this case, as described in FIG. 12A, the first image is displayed in real time on the display device 14. The display on the display device 14 is a scene in which the object obj1 on the first image walks in real time.

In FIG. 13B, a display example of the display device 14 of a case where the superimposition starting operation is performed and then the superimposition ending operation is performed in a case where the first image is set as a display object and displayed on the display device 14 is illustrated.

In this case, as described in FIG. 12B, the first image is displayed in real time and the second image is displayed slowly on the display device 14 after the superimposition starting operation is performed. The display on the display device 14 becomes a display where a scene in which the object obj1 on the first image walks in real time and a scene in which the object obj2 on the second image walks slowly are superimposed.

In FIG. 13B, with time at which the superimposition starting operation is performed being a reference (0), the superimposition ending operation is performed in five seconds after that.

When the superimposition ending operation is performed, the end processing is performed. In a case where the following display is performed, reproduction of the first image on the display device 14 is stopped, and a frame of the first image which frame is reproduced when the superimposition ending operation is performed is kept displayed as a still image in the end processing.

On the other hand, reproduction of the second image on the display device 14 is continued and the scene in which the object obj2 on the second image walks slowly is kept displayed.

In FIG. 13B, after the superimposition ending operation performed in five seconds with the time at which the superimposition starting operation is performed being the reference, a superimposition display of the frame of the first image which frame is reproduced when the superimposition ending operation is performed and the frame of the second image which frame is reproduced slowly is started.

Then, the superimposition display is continued even after 10 seconds from the time at which the superimposition starting operation is performed (after five second from performance of superimposition ending operation).

The reproduction of the second image on the display device 14 is continued to a frame at the same time with the frame, in which the reproduction of the first image is stopped, and is stopped.

In FIG. 13B, the superimposition ending operation is performed in five seconds after the superimposition starting operation is performed. Thus, the reproduction of the second image on the display device 14 is performed to a frame in five seconds after the time at which the superimposition starting operation is performed.

The number of frames for five seconds of the second image at 240 [fps] is 240×5 frames, and 240×5 frames are displayed with 60 [fps] that is the frame rate of the first image being a display rate in the following display.

Thus, the reproduction of the frames for five seconds of the second image (240×5 frame) on the display device 14 requires 20 seconds=240×5/60.

From the above, the superimposition display of the frame of the first image which frame is reproduced when the superimposition ending operation is performed and the frame of the second image which frame is reproduced slowly is performed for 20 seconds from the time at which the superimposition starting operation is performed (for 15 second after superimposition ending operation is performed).

Then, if 20 seconds passes from the time at which the superimposition starting operation is performed, the object obj2 on the second image overlaps with the object obj1 on the first image displayed as the still image, and the display on the display device 14 is subsequently switched to the first image.

According to the above-described following display, a user can intuitively grasp a temporal deviation between a real-time display and a slow display.

Note that in the above-described following display, the display on the display device 14 is switched to the first image after the object obj2 on the second image overlaps with the object obj1 on the first image displayed as the still image. However, other than that, for example, it is possible to keep a display in a state in which the object obj2 on the second image overlaps with the object obj1 on the first image until a predetermined event such as operation by a user is generated and to switch the display on the display device 14 to the first image in a case where the predetermined event is generated.

Also, in the above-described following display, the reproduction of the second image on the display device 14 is continued until the object obj2 on the second image overlaps with the object obj1 on the first image displayed as the still image. However, other than that, for example, it is possible to stop reproduction of the second image on the display device 14 and to switch the display on the display device 14 to the first image in a case where a predetermined event such as operation by a user is generated during the reproduction of the second image on the display device 14.

Figure 14:
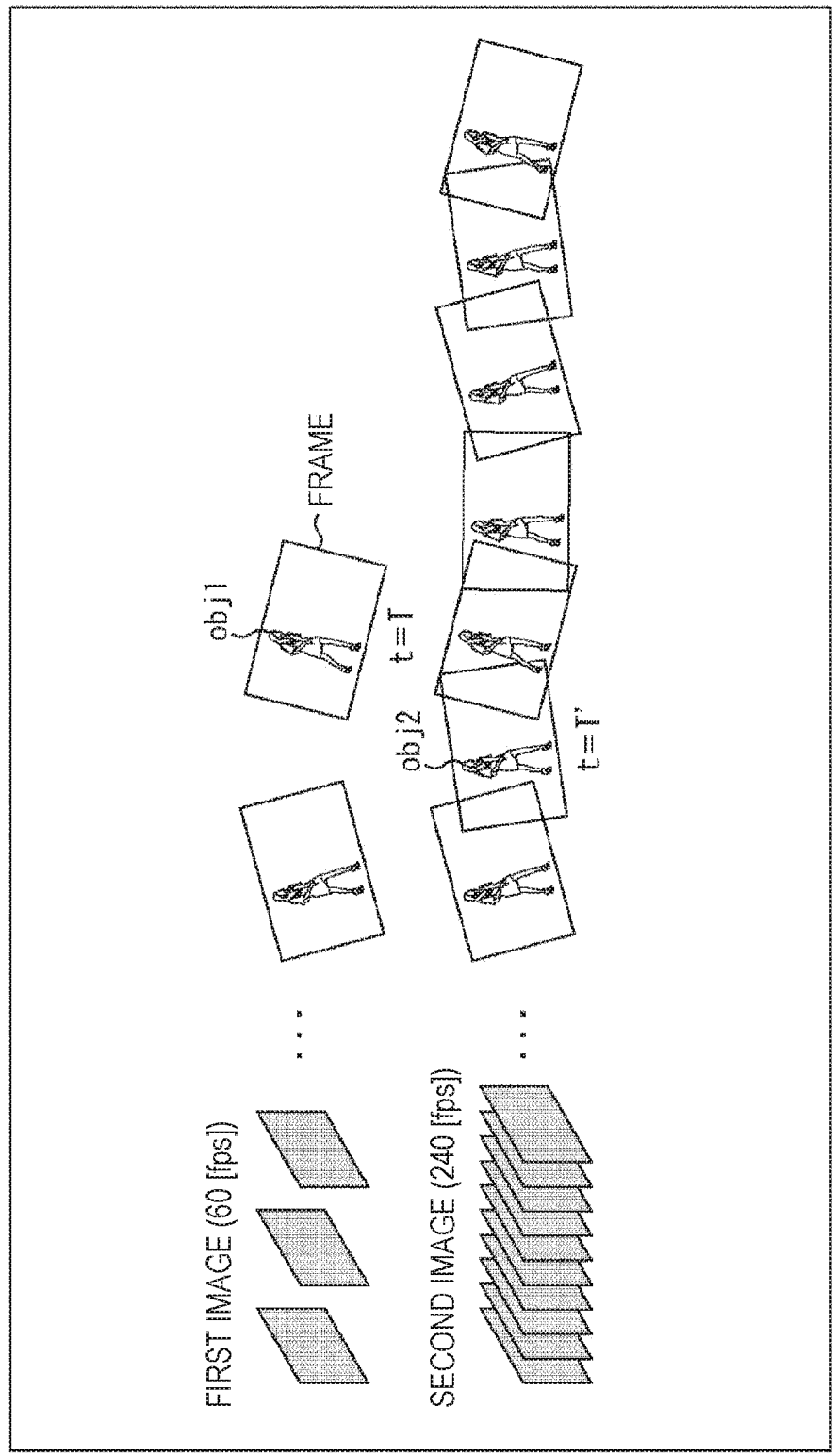
FIG. 14 is a view schematically illustrating the first and second images.

FIG. 14 is a view schematically illustrating the first and second images.

In FIG. 14, similarly to the case of FIGS. 12A and 12B, a first image at 60 [fps] and a second image at 240 [fps] are imaged in the imaging device 12, and a person walking from the left to the right is on the first and second images respectively as the object obj1 and the obj2.

Here, a superimposition display of the first and second images at a reference rate after the superimposition starting operation is also simply referred to as a superimposition display of the first and second images. If necessary, the superimposition display of the first and second images includes a superimposition display of the first and second images which display is performed in the following display performed after the superimposition ending operation.

In the superimposition display of the first and second images, there is a case where frames at different time of the first and second images are superimposed.

On the other hand, in imaging of an image by a digital camera, there is a case where a camera shake is generated or imaging is performed by panning or the like of a digital camera, and a digital camera may be moved.

If there is a movement in a digital camera in imaging of an image by the digital camera, there is a case where a rotational deviation (deviation in posture) is generated in an object on frames at different time of the first and second images or a positional deviation is generated in a non-moving object such as a background, for example.

In FIG. 14, a rotational deviation is generated between the object obj1 that is on a frame at time t=T of the first image and the object obj2 that is on a frame at time t=T', which is different from the time t=T, of the second image.

In a case where a superimposition display is performed with frames of the first and second images, in which frames a rotational deviation or a positional deviation is generated, being used as they are, a composite image acquired by composition of the frames of the first and second images which composition is performed for the superimposition display may become an image that makes a user feel strange.

That is, for example, there is a case where a composite image becomes an image with an unnatural deviation in postures of the objects obj1 and obj2 or an image with an unnatural positional deviation in a background.

Then, in the superimposition display of the first and second images, in the display control unit 35, composition of the frames of the first and second images can be performed after conversion processing of correcting a deviation generated due to movement of a digital camera (hereinafter, also referred to as movement deviation) such as a positional deviation or a rotational deviation of the frames of the first and second images that are objects of the superimposition display (hereinafter, also referred to as correction conversion processing) is performed with respect to one or both of the frames of the first and second images.

Figure 15:
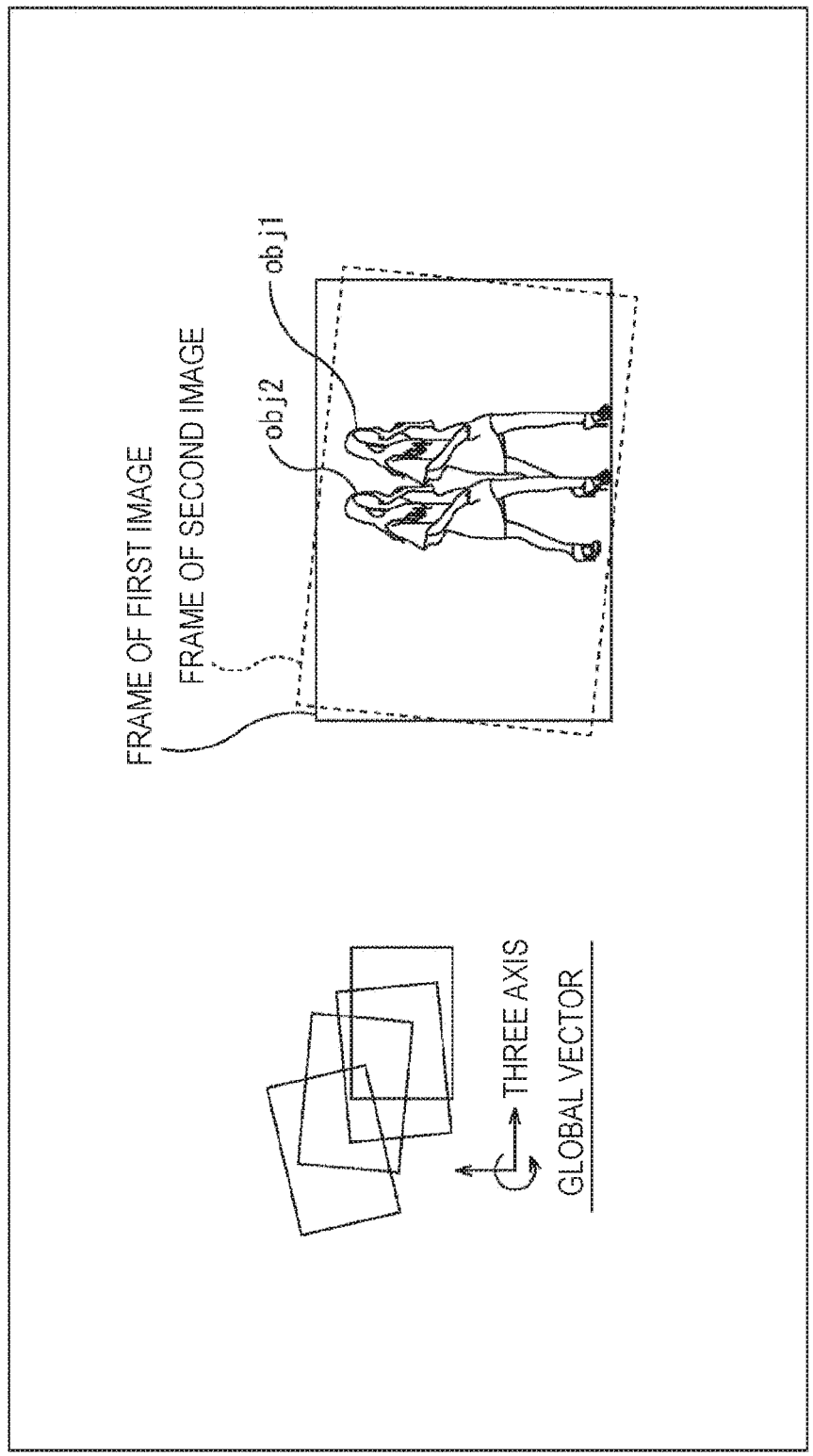
FIG. 15 is a view for describing an example of correction conversion processing.

FIG. 15 is a view for describing an example of the correction conversion processing.

In FIG. 15, the correction conversion processing is performed with respect to a frame of the second image, and a frame that is an original frame of the second image being rotated slightly in a clockwise direction is acquired as a frame of the second image after the correction conversion processing.

With this arrangement, the frame of the second image after the correction conversion processing is a frame in which a movement deviation from a frame of the first image is reduced. By composition of such a frame (frame of second image after correction conversion processing) and the frame of the first image, a composite image with reduced strangeness (unnaturalness) can be acquired.

Note that in the correction conversion processing, for example, it is possible to convert the frame of the second image in such a manner that a difference between pixel values of the frames of the first and second images which difference is due to a rotational deviation of a major object on the frames of the first and second images that are objects of the superimposition display is eliminated.

In the display control unit 35, for example, an object a size of which is equal to or larger than a threshold, an object a movement amount of which is equal to or larger than a threshold, or the like can be selected as a major object from objects that are on the frames of the first and second images. Alternatively, an object designated by operation of the input device 17 by a user can be selected as a major object.

Also, in the correction conversion processing, for example, it is possible to convert the frame of the second image in such a manner that a difference between pixel values of the frames of the first and second images which difference is due to a deviation in a background, in a horizontal direction, or in a degree of tilting is eliminated.

Moreover, in the correction conversion processing, for example, it is possible to calculate a global vector indicating, with one of the frames of the first and second images as a reference, a deviation in the whole other frame and to convert the frame of the second image in such a manner that the global vector becomes 0.

By the correction conversion processing in the above-described manner, a superimposition display of the first and second images in which an influence due to a movement deviation is reduced can be performed.

As described above, according to the digital camera in FIG. 1, it is possible to freely change a frame rate of an image imaged by the imaging device 12 and to perform a real-time display thereof on the display device 14. Thus, an interface useful for a user to easily determine an optimal frame rate can be provided.

Moreover, according to the digital camera in FIG. 1, for example, it is possible to image and output first and second images as a plurality of images at different frame rates in the imaging device 12, and to perform a display thereof on the same position in the display region of the display device 14 by flip switching. Thus, it is possible to provide an interface useful for a user to intuitively recognize a difference in image quality between first and second images at different frame rates and to easily determine an optimal frame rate in a photographing site.

Also, according to the digital camera in FIG. 1, in the reference rate display control processing, a display rate of the display device 14 is fixed to a reference rate with a frame rate of the first image as the reference rate, and the first and second images are displayed at the reference rate. In this case, the first image is displayed in real time, and the second image is displayed slowly or in a fast-forwarded manner. Thus, it is possible to provide an interface useful for a user to intuitively recognize an effect of a slow or fast-forward display and to easily determine an optimal frame rate in a photographing site.

<Description of Computer to which Present Technology is Applied>

Next, the above-described series of processing can be performed by hardware or by software. In a case where the series of processing is performed by software, a program included in the software is installed into a general computer or the like.

Figure 16:
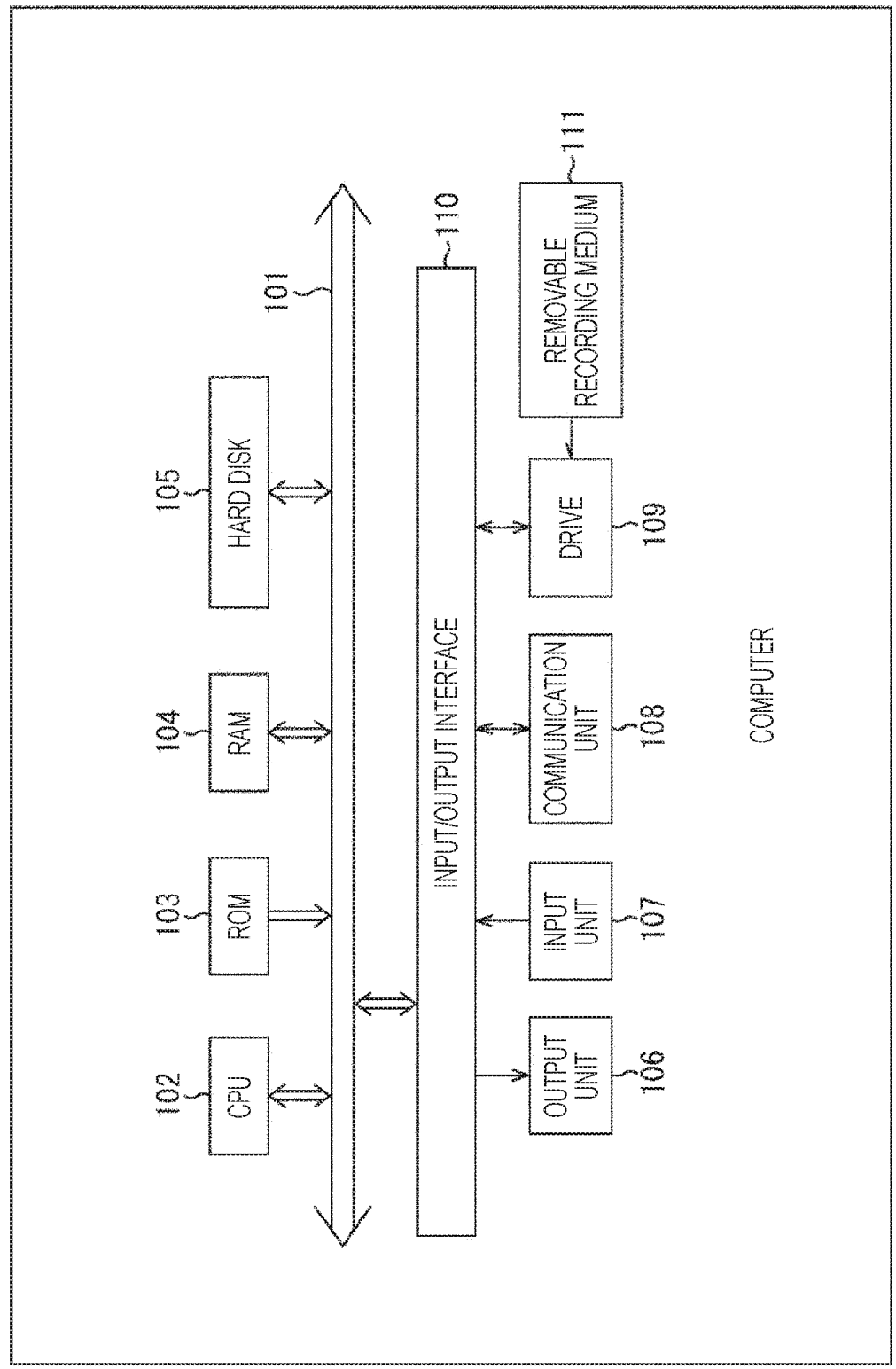
FIG. 16 is a block diagram illustrating a configuration example of an embodiment of a computer to which the present technology is applied.

FIG. 16 is a block diagram illustrating a configuration example of an embodiment of a computer to which a program to execute the above-described series of processing is installed.

The program can be previously recorded in a hard disk 105 or a ROM 103 as a recording medium built in a computer.

Alternatively, the program can be stored (recorded) in a removable recording medium 111. Such a removable recording medium 111 can be provided as so-called packaged software. Here, as the removable recording medium 111, there is a flexible disk, a compact disc read only memory (CD-ROM), a magneto optical (MO) disk, a digital versatile disc (DVD), a magnetic disk, or a semiconductor memory, for example.

Note that other than being installed from the above-described removable recording medium 111 into the computer, the program can be downloaded into the computer through a communication network or a broadcasting network and can be installed into the built-in hard disk 105. That is, for example, the program can be transferred from a download site to the computer in a wireless manner through an artificial satellite for digital satellite broadcasting, or can be transferred to the computer in a wired manner through a network such as a local area network (LAN) or the Internet.

A central processing unit (CPU) 102 is built in the computer, and an input/output interface 110 is connected to the CPU 102 through a bus 101.

When a command is input through the input/output interface 110 by operation of an input unit 107 or the like by a user, the CPU 102 executes a program stored in a read only memory (ROM) 103 according thereto. Alternatively, the CPU 102 loads a program stored in the hard disk 105 into a random access memory (RAM) 104 and executes the program.

With this arrangement, the CPU 102 performs processing according to the above-described flowchart or processing performed by a configuration in the above-described block diagram. Then, if necessary, the CPU 102 outputs a result of the processing from an output unit 106 or transmits the result from a communication unit 108 through the input/output interface 110 and, for example, records the result into the hard disk 105.

Note that the input unit 107 includes a keyboard, a mouse, a microphone, or the like. Also, the output unit 106 includes a liquid crystal display (LCD), a speaker, or the like.

Here, in the present description, processing performed by the computer according to the program is not necessarily performed in a time series in order described in a flowchart. That is, the processing performed by the computer according to the program includes processing executed in parallel or individually (such as parallel processing or processing by object).

Also, the program may be processed by one computer (processor) or processed in a distributed manner by a plurality of computers. Moreover, the program may be transferred to and executed by a remote computer.

Moreover, in the present description, a system means an aggregation of a plurality of components (device, module (part), and the like) and all components are not necessarily in the same housing. Thus, both of a plurality of devices, which is housed in different housings and is connected to each other through a network, and one device in which a plurality of modules is housed in one housing are systems.

Note that an embodiment of the present technology is not limited to the above-described embodiment and various modifications can be made within the spirit and the scope of the present technology. For example, the present technology can be applied to, in addition to a first image and a second image that are at different frame rates and that have different image quality in frames at the same time, a first image and a second image that are at different frame rates or that have different image quality in frames at the same time, that is, a first image and a second image that are at different frame rates and that have the same image quality in frames at the same time, or a first image and a second image that are at the same frame rate and that have different image quality in frames at the same time.

Moreover, for example, the present technology can include a configuration of cloud computing in which one function is divided by a plurality of devices through a network and processing is performed in cooperation.

Also, each step described in the above flowchart can be executed by one device or can be divided and executed by a plurality of devices.

Moreover, in a case where a plurality of kinds of processing is included in one step, the plurality of kinds of processing included in the one step can be executed by one device or can be divided and executed by a plurality of devices.

Moreover, an effect described in the present description is just an example and not the limitation. There may be a different effect.

Note that the present technology can include the following configurations.

<1>
A display control device including:
a display control unit that performs display control of displaying at least a first image and a second image, which are at different frame rates or which have different image quality in frames at the same time, on the same position in a display region of a display device.

<2>
The display control device according to <1>,
in which a frame rate of one image between the first image and the second image is changed according to one operation by a user.

<3>
The display control device according to <2>,
in which a frame rate of an image, which is displayed on the display device, between the first image and the second image is changed.

<4>
The display control device according to any one of <1> to <3>,
in which the display control unit switches a display object displayed on the display device from an image, which is displayed on the display device, between the first image and the second image to the other image.

<5>
The display control device according to <4>,
in which the display control unit switches the display object according to one operation by a user.

<6>
The display control device according to <4> or <5>,
in which the display control unit enlarges and displays a part of the image of the display object.

<7>
The display control device according to <6>,
in which the display control unit enlarges a part of the image of the display object according to one operation by a user.

<8>
The display control device according to <4> or <5>,
in which the display control unit displays the image of the display object in a size corresponding to the number of pixels of the image.

<9>
The display control device according to any one of <1> to <8>,
in which the display control unit displays the first image and the second image in real time on the display device.

<10>
The display control device according to <1>,
in which at a display rate equal to a frame rate of one image between the first image and the second image, the display control unit displays the other image.

<11>
The display control device according to <10>,
in which the display control unit performs a superimposition display of the first image and the second image.

<12>
The display control device according to <11>,
in which the display control unit performs the superimposition display of the first image and the second image according to one operation by a user.

<13>
The display control device according to <11> or <12>,
in which the display control unit stops reproduction, on the display device, of one image at a low frame rate between the first image and the second image after the superimposition display of the first image and the second image is performed, continues reproduction of the other image on the display device until a frame at the same time with a frame in which reproduction of the one image is stopped, and stops reproduction of the other image on the display device.

<14>

The display control device according to <13>, in which the display control unit releases the superimposition display of the first image and the second image according to one operation by a user, and stops reproduction of the one image on the display device in the release of the superimposition display of the first image and the second image, continues reproduction of the other image on the display device until a frame at the same time with a frame in which the reproduction of the one image is stopped, and stops the reproduction of the other image on the display device.

<15>

The display control device according to any one of <11> to <14>, in which the display control unit performs a superimposition display of the first image and the second image after a correction of a deviation in an object on the first image and the second image.

<16>

The display control device according to <10>, in which the display control unit switches a display object displayed on the display device to a different image from an image, which is displayed on the display device, between the first image and the second image.

<17>

The display control device according to <16>, in which the display control unit switches the display object according to one operation by a user.

<18>

The display control device according to any one of <1> to <17>, in which each of the first image and the second image is an image that is generated from an image in one stream at a predetermined frame rate and that is at a frame rate equal to or lower than the predetermined frame rate.

<19>

A display control method including the step of:

performing display control of displaying at least a first image and a second image, which are at different frame rates or which have different image quality in frames at the same time, on the same position in a display region of a display device.

<20>

A program causing a computer to function as a display control unit that performs display control of displaying at least a first image and a second image, which are at different frame rates or which have different image quality in frames at the same time, on the same position in a display region of a display device.

REFERENCE SIGNS LIST

11 Optical system
12 Imaging device
13 Digital signal processing unit
14, 15 Display device
16 Memory
17 Input device
18 Control unit
19 Sensor unit
20 Driver IC
31, 32 Developing processing unit
33 Image analysis unit
34 Recording/reproducing processing unit
35 Display control unit
41 Dial
42 Shutter button
101 Bus
102 CPU
103 ROM
104 RAM
105 Hard disk
106 Output unit
107 Input unit
108 Communication unit
109 Drive
110 Input/output interface
111 Removable recording medium

The invention claimed is:

1. A display control device, comprising:
a display control unit configured to:
control a display device to display a first image in a display region, wherein the first image has a first frame rate;
set a second frame rate of a second image based on a first user operation;
determine a size of the second image based on the set second frame rate, wherein the size of the second image is different from a size of the first image; and
control the display device to switch the displayed first image with the second image based on a second user operation, wherein
a center position of the second image displayed in the display region is same as a center position of the display region,
a display rate of the second image is equal to the first frame rate of the first image,
the first frame rate of the first image is different from the second frame rate of the second image,
an exposure time of the first image is different from an exposure time of the second image,
an image quality in a frame of the first image is different from an image quality in a frame of the second image, and
the frame of the first image and the frame of the second image are at a same time.

2. The display control device according to claim 1, further comprising a control unit configured to change one of the second frame rate or the first frame rate based on a third user operation.

3. The display control device according to claim 2, wherein
the control unit is further configured to change one of the first frame rate of the first image or the second frame rate of the second image based on which one of the first image or the second image is displayed on the display device.

4. The display control device according to claim 1, wherein the display control unit is further configured to:
control the display device to display a display object corresponding to the first image; and
control the display device to switch the displayed display object corresponding to the first image with a display object corresponding to the second image.

5. The display control device according to claim 4, wherein the display control unit is further configured to switch the displayed display object corresponding to the first image to the display object corresponding to the second image based on the second user operation.

6. The display control device according to claim 4, wherein the display control unit is further configured to:
enlarge a part the displayed display object corresponding to the first image; and control the display device to display the enlarged part of the displayed display object corresponding to the first image.

7. The display control device according to claim 6, wherein the display control unit is further configured to enlarge the part of the displayed display object corresponding to the first image based on a fourth user operation.

8. The display control device according to claim 1, wherein the display control unit is further configured to control the display device to display the first image and the second image in real time.

9. The display control device according to claim 1, wherein
the displayed first image and the displayed second image are superimposed.

10. The display control device according to claim 9, wherein the first image and the second image are superimposed based on the second user operation.

11. The display control device according to claim 9, wherein the display control unit is further configured to:
stop reproduction of the first image on the display device based on superimposed display of the first image and the second image, wherein the first frame rate of the first image is lesser than the second frame rate of the second image;
continue reproduction of the second image on the display device until the frame of the second image, wherein the frame of the second image is at a same time with the frame of the first image for which the reproduction is stopped; and
stop the reproduction of the second image on the display device based on the continuation of the reproduction of the second image until the frame of the second image.

12. The display control device according to claim 11, wherein the display control unit is further configured to:
release the superimposed display of the first image and the second image based on a fifth user operation;
stop reproduction of the first image on the display device to release the superimposed display of the first image and the second image;
continue reproduction of the second image on the display device until a third frame of the second image that is at a same time with a fourth frame of the first image for which the reproduction is stopped; and
stop the reproduction of the second image on the display device based on continuation of the reproduction of the second image until the third frame of the second image.

13. The display control device according to claim 9, wherein the first image and the second image are superimposed based on a correction of a deviation in an object on the first image and the second image.

14. The display control device according to claim 1, wherein
each of the first image and the second image is generated from a stream of images; and
each of the first frame rate of the first image and the second frame rate of the second image is one of equal to or lower than a specific frame rate.

15. A display control method, comprising:
controlling a display device to display a first image in a display region, wherein the first image has a first frame rate;
setting a second frame rate of a second image based on a first user operation;
determining a size of the second image based on the set second frame rate, wherein the size of the second image is different from a size of the first image; and
controlling the display device to switch the displayed first image with the second image based on a second user operation, wherein
a center position of the second image displayed in the display region is same as a center position of the display region,
a display rate of the second image is equal to the first frame rate of the first image,
the first frame rate of the first image is different from the second frame rate of the second image,
an exposure time of the first image is different from an exposure time of the second image,
an image quality in a frame of the first image is different from an image quality in a frame of the second image, and
the frame of the first image and the frame of the second image are at a same time.

16. A non-transitory computer-readable medium having stored thereon computer-executable instructions that, when executed by a processor, cause the processor to execute operations, the operations comprising:
controlling a display device to display a first image in a display region, wherein the first image has a first frame rate;
setting a second frame rate of a second image based on a first user operation;
determining a size of the second image based on the set second frame rate, wherein the size of the second image is different from a size of the first image; and
controlling the display device to switch the displayed first image with the second image based on a second user operation, wherein
a center position of the second image displayed in the display region is same as a center position of the display region,
a display rate of the second image is equal to the first frame rate of the first image,
the first frame rate of the first image is different from the second frame rate of the second image,
an exposure time of the first image is different from an exposure time of the second image,
an image quality in a frame of the first image is different from an image quality in a frame of the second image, and
the frame of the first image and the frame of the second image are at a same time.

\* \* \* \* \*